US011132294B2

(12) United States Patent
Nilsen

(10) Patent No.: US 11,132,294 B2
(45) Date of Patent: *Sep. 28, 2021

(54) REAL-TIME REPLICATING GARBAGE COLLECTION

(71) Applicant: International Business Machines Corporation, Armonk, NY (US)

(72) Inventor: Kelvin Don Nilsen, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 148 days.

This patent is subject to a terminal disclaimer.

(21) Appl. No.: 16/368,253

(22) Filed: Mar. 28, 2019

(65) Prior Publication Data

US 2020/0310963 A1 Oct. 1, 2020

(51) Int. Cl.
*G06F 17/00* (2019.01)
*G06F 12/02* (2006.01)
(Continued)

(52) U.S. Cl.
CPC .......... *G06F 12/0253* (2013.01); *G06F 9/485* (2013.01); *G06F 9/5005* (2013.01); *G06F 16/27* (2019.01); *G06F 2212/7205* (2013.01)

(58) Field of Classification Search
CPC ............. G06F 12/0253; G06F 12/0269; G06F 12/0806; G06F 9/5005; G06F 9/485; G06F 9/4881; G06F 16/27; G06F 16/128; G06F 16/162; G06F 16/1724; G06F 16/1727; G06F 16/1858; G06F 16/2308; G06F 16/273; G06F 16/275; G06F 16/278; G06F 2212/7205; G06F 3/0608; G06F 9/5022; G06F 2212/1024; G06F 12/0261

See application file for complete search history.

(56) References Cited

U.S. PATENT DOCUMENTS 6,081,665 A * 6/2000 Nilsen ................. G06F 9/45504
717/116
7,584,232 B2 9/2009 Guo
(Continued)

OTHER PUBLICATIONS

M. Maas, K. Asanović and J. Kubiatowicz, "A Hardware Accelerator for Tracing Garbage Collection," 2018 ACM/IEEE 45th Annual International Symposium on Computer Architecture (ISCA), pp. 138-151, doi: 10.1109/ISCA.2018.00022, Jun. 2018.*
(Continued)

*Primary Examiner* — Greta L Robinson
(74) *Attorney, Agent, or Firm* — Jorge M. Maranto

(57) ABSTRACT

A method and a system for garbage collection on a system. The method includes initiating a garbage collection process on a system by a garbage collector. The garbage collector includes one or more garbage collector threads. The method also includes marking a plurality of referenced objects using the garbage collector threads and one or more application threads during a preemption point. The method includes replicating the referenced objects using the garbage collector threads and marking for replication any newly discovered referenced objects found by scanning the application thread stack from a low-water mark. The method also includes replicating the newly discovered referenced objects and overwriting any reference to the old memory location.

20 Claims, 15 Drawing Sheets

FIG. 1

(51) Int. Cl.
  *G06F 9/50* (2006.01)
  *G06F 16/27* (2019.01)
  *G06F 9/48* (2006.01)

(56) References Cited

U.S. PATENT DOCUMENTS

| | | | | |
|---|---|---|---|---|
| 7,653,793 | B1* | 1/2010 | Garthwaite | G06F 12/0269 |
| | | | | 711/159 |
| 7,747,659 | B2* | 6/2010 | Bacon | G06F 12/0253 |
| | | | | 707/816 |
| 8,423,589 | B2 | 4/2013 | Burka et al. | |
| 9,846,645 | B1* | 12/2017 | Gidra | G06F 12/0261 |
| 10,459,656 | B1* | 10/2019 | Nilsen | G06F 12/0253 |
| 2007/0203960 | A1 | 8/2007 | Guo | |
| 2015/0081996 | A1 | 3/2015 | Flood | |
| 2020/0409841 | A1* | 12/2020 | Nilsen | G06F 3/0652 |

OTHER PUBLICATIONS

Nilsen, K., Multi-Threaded Pause-Less Replicating Garbage Collection, U.S. Appl. No. 16/452,971, filed Jun. 26, 2019.

List of IBM Patents or Patent Applications Treated as Related, Signed Jun. 26, 2019, 2 pages.

Anonymous, "Processing for Efficient Triggering of Soft Real-Time Java Garbage Collection to Optimize Throughput, Latency, and Power Consumed," IP.com Prior Art Database Technical Disclosure, IP.com No. IPCOM000203697D, Jan. 29, 2011, 3 pages. https://ip.com/IPCOM/000203697.

Anonymous, "CPC—Garbage Collection with prioritized object eviction mechanism," IP.com Prior Art Database Technical Disclosure, IP.com No. IPCOM000216936D, Apr. 25, 2012, 5 pages. https://ip.com/IPCOM/000216936.

Appelbe, L., "Back-traced Garbage Collection," IP.com Prior Art Database Technical Disclosure, IP.com No. IPCOM000251311D, Oct. 30, 2017, 9 pages. https://ip.com/IPCOM/000251311.

IBM, "Dynamic Generation of Computer Instructions to Accelerate Garbage Collection," IP.com Prior Art Database Technical Disclosure, IP.com No. IPCOM000143747D, Dec. 6, 2006, 5 pages. https://ip.com/IPCOM/000143747.

Gnirss, M., "GS02—IBM Z News," 11th European GSE/IBM Technical University for z/VSE, z/VM, KVM and Linux on IBM z Systems, Oct. 23, 2017, 74 pages.

Spinellis, D. & Gousios, G. (Eds.), "Beautiful Architecture: Leading Thinkers Reveal the Hidden Beauty in Software Design," 2009, 428 pages, O'Reilly.

Walle, M., "The Latest and Greatest z/OS Release is Here: V2R3!" UK Conference 2017, The Future.Ready() Mainframe, Nov. 7, 2017, 77 pages.

Nilsen, K., "Real-Time Java in Modernization of the Aegis Weapon System," HILT '12: Proceedings of the 2012 ACM Conference on High Integrity Language Technology, Dec. 2012, pp. 63-69.

Nilsen, K., "Understanding the Role of Real-Time Java in Aegis Warship Modernization," IEEE Software Technology Conference, Apr. 2013, 17 pages. http://conferences.computer.org/stc/2013/papers/0001a044.pdf.

Nettles et al., "Real-Time Replication Garbage Collection," PLDI '93: Proceedings of the ACM SIGPLAN 1993 Conference on Programming Language Design and Implementation, 1993, pp. 217-226, ACM.

Nettles et al. "Replication-Based Incremental Copying Collection," IWMM '92: Proceedings of the International Workshop on Memory Management, 1992, pp. 357-364.

Nilsen, K., "Adding Real-Time Capabilities to Java," Communications of the ACM, vol. 41, No. 6, Jun. 1998, pp. 49-56, DOI: 10.1145/276609176619.

Nilsen, K., "Method and Apparatus to Represent Activation Frame for Pause-Less Garbage Collection," U.S. Appl. No. 16/017,107, filed Jun. 25, 2018.

Nilsen, K., "Placement of Explicit Preemption Points Into Compiled Code," U.S. Appl. No. 16/282,807, filed Feb. 22, 2019.

\* cited by examiner

REAL-TIME REPLICATING GARBAGE COLLECTION

BACKGROUND

The present invention relates to garbage collection, and more specifically, to real-time replicating garbage collection.

Programs, running on a finite amount of memory, may need to recover the storage used by objects that are no longer needed for computation. Memory, used by objects stored in a heap, can be reclaimed using explicit deallocation (e.g., C's free or C++'s delete operators) or automatically by the run-time system, also known as garbage collection. Explicit deallocation allows a programmer to specify when an object is no longer needed and can release the memory used by the object. Garbage collection reclaims memory by evaluating the heap automatically without a programmer needing to explicitly release the unneeded object.

SUMMARY

Various embodiments are directed to a method of garbage collection on a system. The method can include initiating the system, by a garbage collector, to prepare for garbage collection. The garbage collector can include one or more garbage collector threads. Further, the method can also include marking a plurality of referenced objects using the garbage collector threads and one or more application threads. The referenced objects can be found by scanning a plurality of application thread stacks during a preemption point found in the compiled code of an application. The method can also include marking for replication any new referenced objects discovered by scanning the application thread stacks from a low water-mark. The new referenced objects can be replicated from a from-space memory to a to-space memory location. The method can also include overwriting any reference to the from-space memory found on the objects that were replicated in the process and replacing them with to-space references.

Further embodiments are directed to a computer program product for garbage collection on a system, which can include a computer readable medium having program instructions therewith, the program instructions executable by a processor to cause the system to execute instructions. The instructions cause the system to initiate the system for garbage collection utilizing a garbage collector. The garbage collector can include one or more garbage collector threads. Further, the device can also mark a plurality of referenced objects using the garbage collector threads and one or more application threads. The referenced objects can be found by a scan of a plurality of application thread stacks during a preemption point found in the compiled code of an application. The system can also mark for replication any new referenced objects discovered by scanning the application thread stacks from a low water-mark. The new referenced objects can be replicated from a from-space memory to a to-space memory location. The system can also overwrite any reference to the from-space memory found on the objects that were replicated in the process and replacing them with to-space references.

Additional embodiments are directed to a system, which can include at least one processing component, at least one memory component, the memory component having program instructions which cause the processor to initiate the system for garbage collection utilizing a garbage collector. The garbage collector can include one or more garbage collector threads. Further, the instructions can also mark a plurality of referenced objects using the garbage collector threads and one or more application threads. The referenced objects can be found by a scan of a plurality of application thread stacks during a preemption point found in the compiled code of an application. The instructions can also mark for replication any new referenced objects discovered by scanning the application thread stacks from a low water-mark. The new referenced objects can be replicated from a from-space memory to a to-space memory location. The instructions can also overwrite any reference to the from-space memory found on the objects that were replicated in the process and replacing them with to-space references.

BRIEF DESCRIPTION OF THE DRAWINGS

These and other features, aspects, and advantages of the embodiments of the disclosure will become better understood with regard to the following description, appended claims, and accompanying drawings where:

Figure 1:
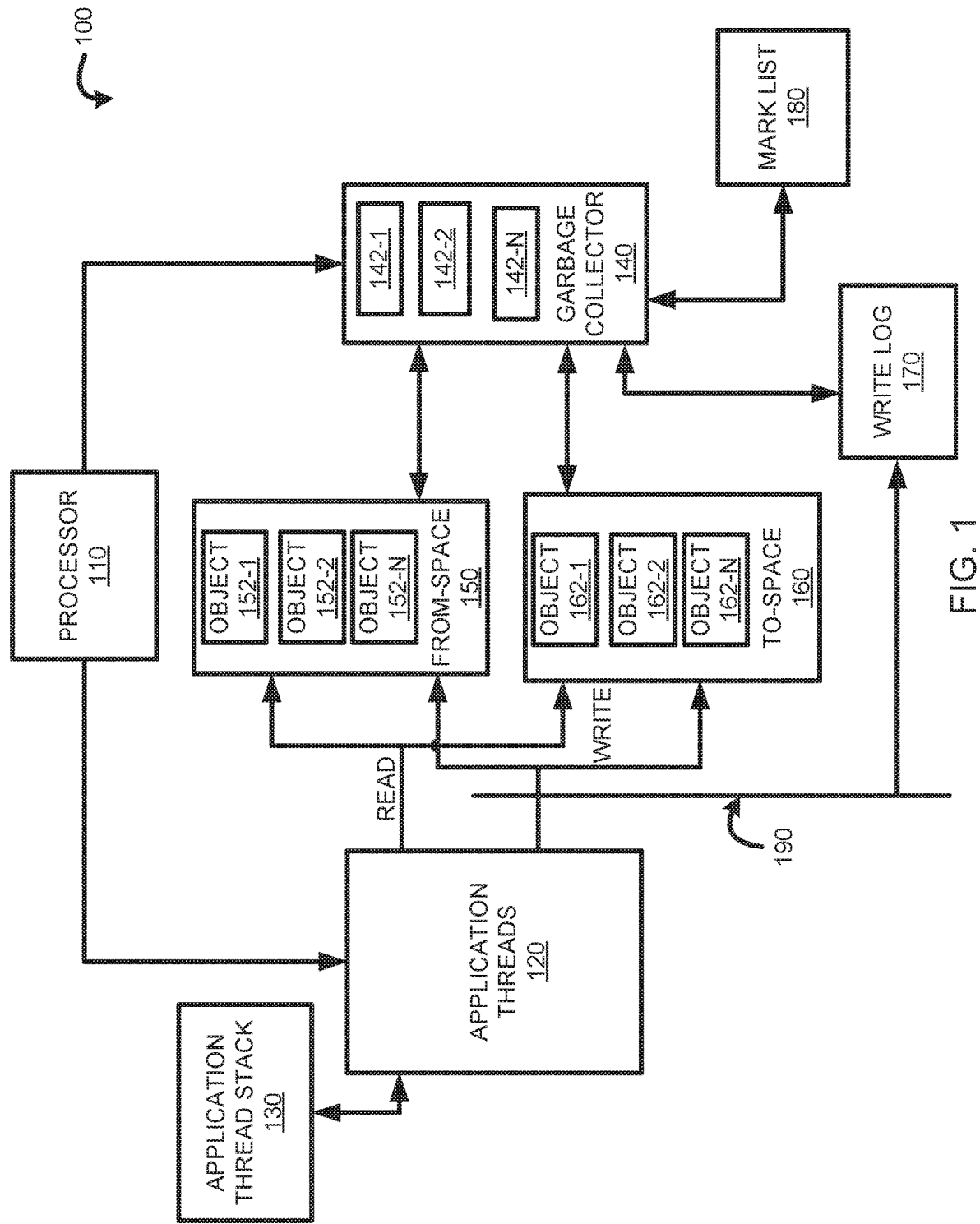
FIG. 1 is a block diagram illustrating a garbage collection system, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the disclosure. Like reference numeral are used to designate like parts in the accompanying drawings.

DETAILED DESCRIPTION

Most modern programming languages, such as Java, manage memory allocation using a form of garbage collection provided by managed code. Older non-managed languages, such as C or C++, explicitly deallocate memory using various operators. Due to the need for frequent coordination between application tasks and garbage collection activities, typical applications using garbage collection have worse performance and higher response latencies than programs written in non-managed languages. However, developers are increasingly turning to modern managed languages with run-time systems due to, at least in part, the increased security bestowed on the code and the flexibility of abstraction. Because of the many services provided by the virtual machine (e.g., garbage collection), programmers have less code to write. Thus, programmers can spend a greater portion of development time on the logic of their application.

Despite the lower performance, developers continue to develop applications with real-time constraints on languages that implement garbage collection. This is due to, at least in part, the ease in which modern languages allow developers to include more features in the application, to provide reliable product integration, and at a lower budgetary cost. This is because explicit memory deallocation provided by non-managed languages risk programming errors during development. For example, memory may be freed prematurely, while there are still references to the freed memory. Such a reference is called a dangling pointer. If the program subsequently follows a dangling pointer, the result can be unpredictable. Another type of error that may occur is when a programmer fails to free an object no longer required by the program, which can lead to a memory leak.

In some development fields, the lower performance suffered by programming languages using garbage collection is too great. For instance, in real-time systems, operational deadlines are imposed on particular tasks within an application. These real-time tasks must be able to respond to application inputs within a fixed time window. Failing to satisfy the constraints may degrade the service of the application or can cause catastrophic failure to the system. Thus, when implementing a real-time system, it must be correct logically and also responsive to real-time events.

Thus, the existing constraints imposed by real-time language technologies impede the adoption of garbage collection in a variety of markets. For example, electronic securities trading, distributed gaming, electronic commerce servers, cyber-security defenses, homeland defense monitoring, and push advertising are some markets in which the performance and response latencies are crucial. Thus, embodiments of the disclosure detail a garbage collection method and system that integrate the developmental ease of modern languages with the performance of non-managed languages.

Disclosed herein are a method and a system for garbage collecting on real-time applications. The method can be initiated, by a garbage collector, to prepare the system for garbage collection. Once initiated, application thread stacks can be scanned incrementally by garbage collection threads and application threads. The method can then replicate any referenced objects found in the thread stacks and then rescan the thread stacks from a point where the stack was impacted during execution. Also, each application thread maintains its own write-log to improve performance over existing methods. Utilizing these various optimization techniques as well as multicore execution, applications implementing the disclosed embodiment can achieve the performance and response time of explicitly deallocated applications.

The term "object" is herein defined to mean any data structure created by an application or process. The terms "reference" and "referenced object" are used interchangeably to describe a data structure that includes a pointer to an object. While the term "pointer" or "object pointer" are sometimes used interchangeably with "reference" and "referenced object", referenced objects may include information in addition to a pointer. A referenced object may be direct or indirect. A direct object reference directly points to an object header, while an indirect object reference points to an object handle. As used herein, the term "referenced object" refers to both types.

FIG. 1 is a block diagram illustrating a garbage collection system 100, according to embodiments of the present disclosure. The garbage collection system includes, but is not limited to, a processor 110, application threads 120, an application thread stack 130, a garbage collector 140, a from-space memory location 150 (hereinafter "from-space 150"), a to-space memory location (hereinafter "to-space 160"), a write log 170, a mark list 180, and a write barrier 190. The garbage collector 140 can include garbage collector thread 142-1, 142-2, 142-N (collectively "garbage collector threads 142"). The from-space 150 can include object 152-1, 152-2, 152-N (collectively "objects 152"). The to-space 160 can include replicated object 162-1, 162-2, 162-N (collectively "replicated objects 162"). The arrangement of components making up the exemplary system illustrated in FIG. 1 are for explanation, not for limitation. Data processing systems useful to various embodiments of the present disclosure may include additional processors, memory, storage drives, and other devices not shown in FIG. 1, as will occur to those of skill in the art. Various embodiments of the present disclosure may be implemented on a variety of hardware platforms in addition to those illustrated in FIG. 1

The processor 110 is a component of the garbage collection system 100 configured to carry out instructions of an application and garbage collector 140. The processor 110 can include two or more CPU called "cores" for computation. Each core on the processor 110 can execute threads of executions, such as the application threads 122 and the garbage collector threads 142.

In some embodiments, the processor 110 dedicates a garbage collector thread 142 to each core on the processor 110. For example, if the processor 110 has four cores, it can dedicate a garbage collector thread 142 to each core, each running on a different core, for background garbage collection efforts. It should be understood that FIG. 1 depicts only a simplified representation of a processor 110.

The application threads 120 are a component of the garbage collection system 100 configured to execute application code, which allocates new objects and alters existing objects. A program may have more than one application thread 120, but the application threads 120 together can usually be thought of as a single actor over the heap. The application threads 120 can exist within one application, executing concurrently and sharing resources such as memory, while different applications may not share resources. In some embodiments, application threads 120 share executable code and dynamically allocated objects at any given time.

The application thread stack 130 is a component of the garbage collection system 100 configured to store reference fields. An application thread 120 may alter the liveness of an object by changing a reference field within the application thread stack 130 so that the reference field refers to different destination objects. As a result of such reference field updates, any object can end up disconnected from root pointers; that is, the object may be unreachable by following any sequence of edges from a root pointer.

The garbage collector 140 is a component of the garbage collection system 100 configured to execute garbage collection code, which discovers unreachable objects and reclaims their storage. The garbage collector 140 can include garbage collector threads 142 configured to execute instructions for garbage collection. Each garbage collector thread 142 can perform a small sequence of programmed instructions that can be managed independently by the garbage collector 140. During garbage collection, the garbage collector 140 can incrementally replicate all accessible objects without impeding application threads 120 from accessing the stored objects. To allow for incremental garbage collection, the garbage collector 140 can suspend its work and permit the application thread to run, even if the garbage collection is not complete.

For replication to occur, memory is divided into two, equally sized semi-spaces. Objects are stored on one semi-space and the garbage collector selects a referenced object from that space to copy to the other semi-space. At the end of the garbage collection, the garbage collector 140 can simply abandon the first semi-space until the next collection cycle. However, the garbage collector can also clear that first semi-space for safety reasons during the initialization of the next collection cycle.

The from-space 150 and the to-space 160 are components of the garbage collection system 100 configured to store objects 152 and replicated objects 162 respectively. Copying garbage collectors generally divide the heap into two, equally size semi-spaces, called from-space 150 and to-space 160. For simplicity, the heap can be considered as one contiguous region of memory, but this is not an essential characteristic. New objects are allocated in to-space 160 prior to the start of garbage collection. When the start of garbage collection begins, the roles of the from-space 150 and the to-space 160 are flipped, new objects are allocated out of the new from-space, and garbage collection incrementally copies all referenced objects from what is now known as the from-space 150 to the region now known as to-space 160. At the end of garbage collection, all referenced objects reside in an unfragmented prefix of the to-space 160.

In some embodiments, the from-space 150 and the to-space 160 is divided into multiple logical memory partitions. Objects contained within a memory partition can be associated with a specific core and can be collected by core-specific garbage collection threads. For example, the core assigned to the memory partition can be the same core executing the garbage collection thread assigned to the objects stored in the memory partition. Determining which specific partition is storing an object can be determined by an analysis of the object's address. For example, certain bits of the object's address can determine the object's memory partition.

The garbage collector 140 can also include coordination threads configured to coordinate garbage collection on each respective memory partition. The garbage collection efforts of each memory partition can be performed by one coordination thread and one or more garbage collector threads 142, all of which can run on the core associated with that memory partition. In some embodiments, each application thread 120 is associated with a particular memory partition, meaning the application thread 120 runs on the core that is associated with the memory partition. An application thread 120 can choose to allocate new objects 152 into a memory partition associated with the core executing the application thread 120 as this may improve cache locality.

The coordination threads can receive information from application threads 120 associated with a particular memory partition. This information can include a description of the objects 152 recently allocated by a thread within its thread-local allocation buffer, overwrite operations performed by the thread which modify the contents of previously allocated objects 152, and lists of references to objects 152 accessed by the application thread and therefore treated as being live objects 152. The coordination thread can also process the information received from application threads 120 and share this information with other threads. For example, the coordination thread can forward the logs of certain overwrite operations and can forward certain live references to a corresponding coordination thread that corresponds to the memory partition containing the overwritten or referenced objects 152.

The coordination thread can also mark objects 152 contained within its memory partition that are directly referenced by live references communicated to the coordination thread by application threads 120 and by other coordination threads. Coordination threads can reserve memory in the to-space 160 to hold the replicas of these objects. When reserving space for replicated objects, a coordination thread can atomically reserve memory in the to-space 160 for a plurality of objects found on the partition's mark list by atomically incrementing a global allocation pointer by the combined size of all the objects. Objects 152 residing in a particular memory partition are typically marked by the coordination thread pertaining to a particular partition. Thus, marking can be performed without synchronization between threads. After memory is reserved for replicated objects 162, the coordination thread can establish a bi-directional link between the replicated object 162 residing in the to-space 160 and the original object residing in the from-space 150.

The coordination thread can link the replicated objects 162 onto a list linked through an unused header word contained within each replicated object 162. The coordination thread can communicate lists of objects that need to be replicated to the garbage collector threads 142. The coordination thread can also communicate lists of overwrite operations, that need to be replicated, to the garbage collector threads 142.

A garbage collector threads 142 can also copy entire objects, one at a time, out of the from-space 150 and into the to-space 160. The garbage collector threads 142 can also copy overwritten fields out of the from-space 150 and into the to-space 160. To prevent interference, only one garbage collector thread 142 can copy overwritten fields at a time within each memory partition. No garbage collector thread 142 copies complete objects 152 associated with the same memory partition while another garbage collector thread 142 is copying overwritten fields belonging to the same memory partition. Multiple garbage collector threads 142 can independently copy different objects 152, in parallel with each other, even if the objects being copied reside within the same memory partition.

During certain phases of garbage collection, a garbage collector thread 142 can incrementally scan portions of application thread stacks 130 belonging to threads associated with a particular memory partition. During certain phases of garbage collection, scanning of an application thread stack 130 may include marking any object referenced by a live pointer if the object was not previously marked. During other phases of garbage collection, scanning of an application thread stack 130 may include replacing each live pointer to a first object 152 residing within the from-space 150 with a pointer to a second object 162 which is the replica of the first object 152, where the replica object 162 resides within the to-space 160.

The write log 170 is a component of the garbage collection system 100 configured to record alterations to referenced objects during garbage collection. During garbage collection, the garbage collector 140 makes replicas of original objects 162 while application threads 120 still have access to original objects 152. Situations may occur where an application thread 120 may alter part of an object 152 that has already been replicated. Thus, the write log 170 can track those changes so that the replicated object 162 can be modified to correspond to the changes made prior to the completion of the garbage collection process. This can ensure that the replicated objects 162 reach a consistent state by the time the collection terminates.

In some embodiments, a write log 170 exists for each application thread 120 in the garbage collection system 100. The application threads 120 each maintain and write to their individual write log 170. This reduces global contention bottlenecks, the processing of write logs during garbage collection does not require global locks. A global lock or spin lock can protect individual objects that require concurrency control to manage access from other application threads 120 or garbage collector threads 142. By having each application thread 120 maintain their own write log 170, spin-locks are not required thus reducing processing time.

The mark list 180 is a component of the garbage collection system 100 configured as a list of objects 152 having close affiliations with particular cores. This allows objects 152 to be subsequently processed by a core-specific garbage collector thread 142. By having a core-specific garbage collector thread 142 process objects 152 affiliated with a core executing the garbage collector thread 142, cache locality can be maintained, and inter-core synchronization can be reduced.

The write barrier 190 is a component of the garbage collection system 100 configured to execute extra instructions every time a memory value is stored. In typical garbage collection system, application tasks generally run concurrently with garbage collection. Whenever an object 152 is modified, the garbage collection process may be impacted and whenever the garbage collector 140 replicates an object 162, the application threads 120 may be impacted. Thus, coordination between the application threads 120 and the garbage collector 140 is required. The write barrier 190 is configured to facilitate the coordination between the application threads 120 and the garbage collector 140.

In a typical pause-less garbage collection system, coordination between application threads 120 and the garbage collector 140 is frequent making the system run slower than in other approaches. Due to workloads generally having more read operations than write operations, the use of a write barrier 190 is preferred over the use of a read barrier for facilitating this coordination.

Figure 2:
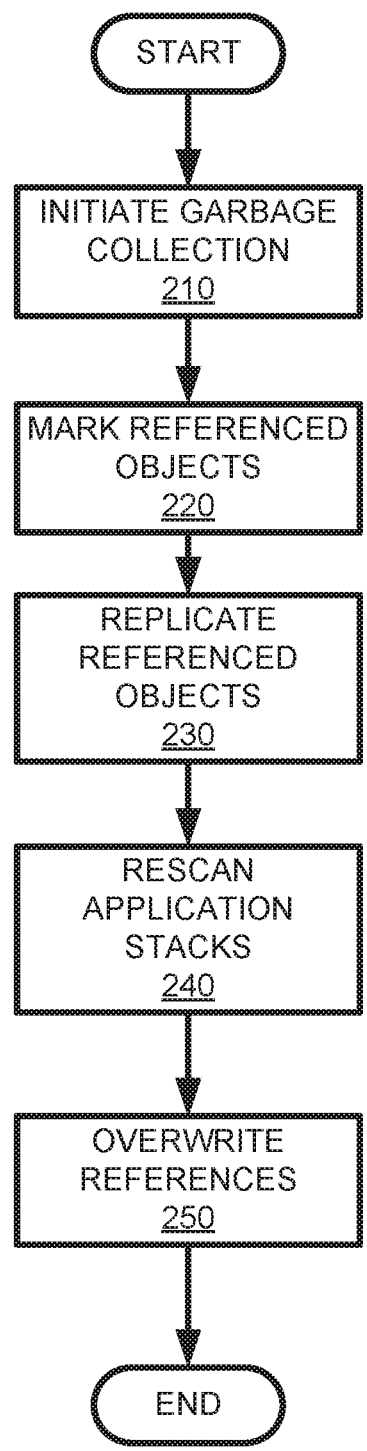
FIG. 2 is a flow diagram illustrating a process of pauseless garbage collection on a garbage collection system, according to embodiments of the present disclosure.

FIG. 2 is a flow diagram illustrating a process 200 for pause-less replicating garbage collection, according to embodiments of the present disclosure. To illustrate process 200, FIG. 2 is described within the context of garbage collection system 100 of FIG. 1.

Garbage collection is initiated by the garbage collection system 100. This is illustrated at step 210. In some embodiments, garbage collection is initiated when the projected time for completion of garbage collection, if started at the current time, approaches too closely to the projected time for depletion of the heap. Also, during this phase, non-thread specific global pointers can be scanned, and corresponding referenced objects 152 can be marked for replication. Garbage collector threads 142 can be set up to begin the effort of scanning the application thread stacks 130. Application threads 120 can be advised to begin tracking their access to heap-memory objects.

Garbage collector threads 142 mark referenced objects 152 found while scanning the application thread stacks 130. This is illustrated at step 220. Objects 152 with a close affiliation with the particular core can be gathered on core-specific mark lists 180. An object 152 can have a core affinity, or processor affinity. Likewise, an application thread 120 can be bound to a core so that the application thread 120 is executed only on the designated core rather than on any core available. As such, objects 152 related to bound application threads 120 can be placed into the mark lists 180 at this step.

In some embodiments, core-specific garbage collector threads 142 utilize mark lists to incrementally scan the application thread stacks 130 for referenced objects 152 to mark for replication. For example, a core-specific garbage collector thread 142 can scan application thread stacks 130 to find references to corresponding objects 152 related to the core that is executing the garbage collector thread 142. This helps to maintain cache locality and reduces inter-core synchronization.

Marked referenced objects 152 are replicated from the from-space 150 to the to-space 160 by a garbage collector thread 142. This is illustrated at step 230. During, or prior to replication, a marked referenced object 152 can be scanned to identify the objects 152 it references. For instance, a marked referenced object 152 can refer to other objects 152 that a root pointer may not directly point to. These objects 152 are considered live and are marked for replication by a garbage collector thread 142. As new objects 152 are marked, additional replication is required for those objects 152 that are marked during replication of the initial referenced objects 152. This additional replication can occur at this step.

There may exist live objects that are only referenced from pointers stored within thread stack activation frames. Furthermore, the activation frame pointers to the live objects may not have been present in the activation frame when the frame was scanned at step 220. Portions of each application thread stack 130 that have potentially been modified since the prior scan are rescanned for referenced objects 152 that have been added or modified. This process can be repeated until no object 152 is marked for replication. This is illustrated at step 240.

In some embodiments, as application thread stacks 130 are being scanned for referenced objects 152, garbage collector threads 142 can also be replicating the marked referenced objects 152. This can continue until there are no marked referenced objects 152 to replicate.

After replication of the live objects from the from-space 150 into the to-space 160, each root pointer that refers to a from-space object 152 is overwritten with a pointer to the associated to-space object 162. This is illustrated at step 250. In some embodiments, overwriting pointers is performed incrementally. This can be achieved by causing application threads to scan portions of each application thread stack 130 when activation frames are newly activated upon return from a called function. In parallel, background garbage collection threads can scan more deeply nested activation frames of the same thread stacks.

Figure 3:
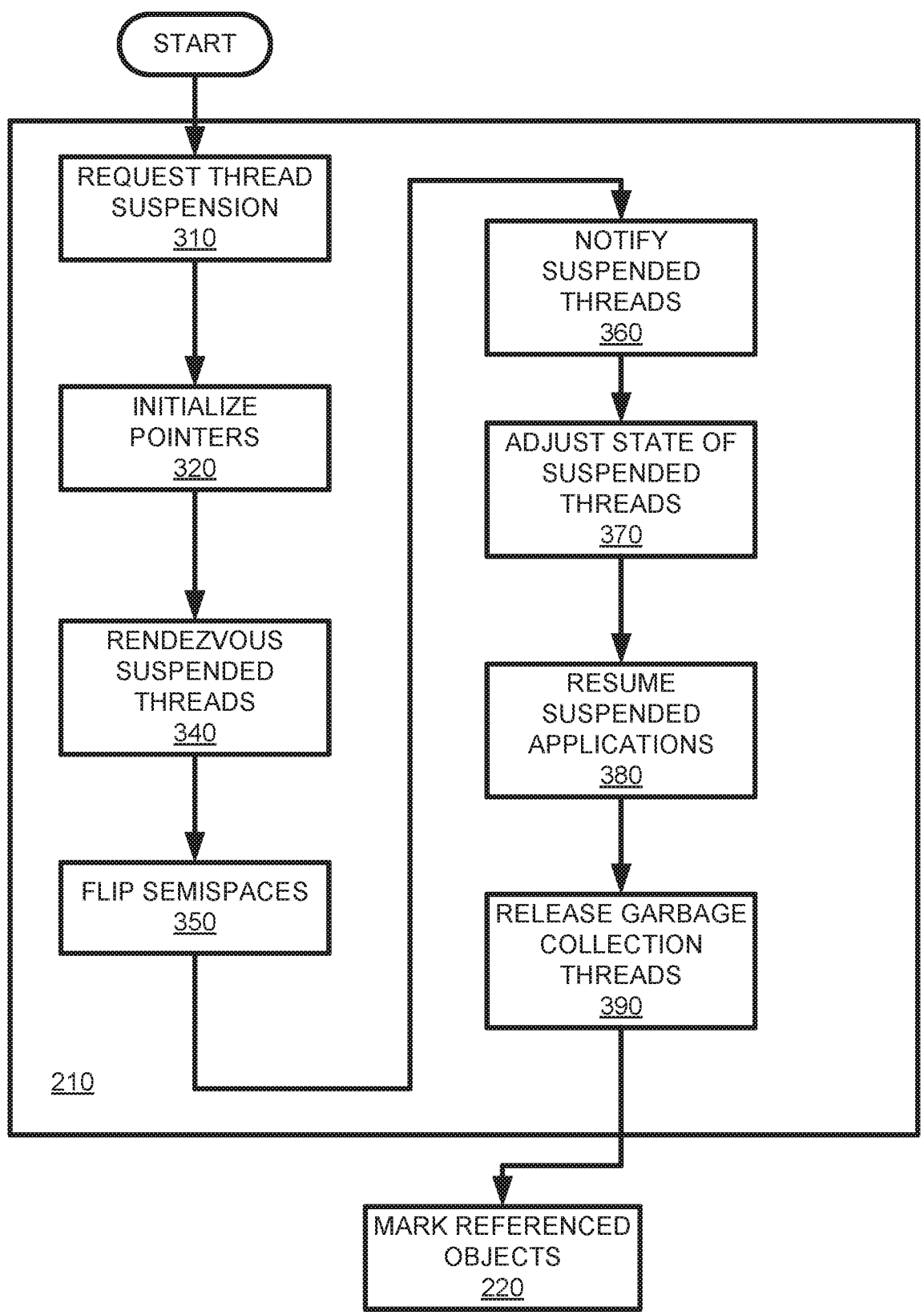
FIG. 3 is a flow diagram illustrating a process of initiating garbage collection, according to embodiments of the present disclosure.

FIG. 3 is a flow diagram illustrating process step 210 of FIG. 2 above, initiating garbage collection, of process 200, in greater detail according to embodiments of the present disclosure. To illustrate process step 210, FIG. 3 is described within the context of garbage collection system 100 of FIG. 1 and process 200 of FIG. 2.

The garbage collector 140 requests application threads 120 to suspend execution. This is illustrated at step 310. An application thread 120 suspends activities such that the garbage collector 140 can initiate the garbage collection process. Suspension can occur during various preemption points in compiled code. A preemption point can be points within compiled code that cause the execution of that code to halt. If, at the time when an application reaches a preemption point, the garbage collector 140 has requested suspension, the application thread 120 temporarily stops execution of the code in order for the garbage collector 140 to incrementally begin garbage collection.

In some embodiments, suspension of execution occurs during an explicit preemption point placed within the compiled code of an executing application. As the application thread 120 reaches a preemption point, context switches between application thread 120 and garbage collector thread 142 are permitted. Preemption of an application thread 120 is postponed until the application thread 120 reaches its next preemption-safe point. This can help to reduce preemption latency and improve the efficiency of the code.

Global pointers are initialized to begin the garbage collection process. This is illustrated at step 320. The garbage collection system 100 can include a replicated pointer and allocated pointer that are utilized during garbage collection. These pointers assist in directing the garbage collector threads 142 in detecting where objects need replication as well as the space where objects can be stored. To prepare the garbage collection system 100, both the replicated pointer and the allocated pointer are set to the front of the to-space 160.

Also, an initial scan of global root pointers can occur. A global root pointer can represent pointers to, for example, the list of currently running application threads 120 as well as a list of application threads 120 that are ready to run but are waiting for available processor 110 resources. Scanning the global root pointers includes marking the objects to which they refer. If an object has not already been marked, then a determination can be made about the size of the object. This can include whether the object is an array as well as the size of the object that includes the headers associated with the objects. Once the size has been determined, space can be reserved in to-space 160 which involves adjusting the replicated and allocated pointers accordingly.

The state of all non-running application threads 120 can also be marked during this initialization period. This provides for an indication that a new garbage collection process has begun. Marking of all threads need not be done atomically. Each thread's state needs to be updated prior to allowing the application thread 120 to resume execution.

Active application threads 120 can be placed onto a list of application thread stacks 130 that require scanning by the background garbage collector threads 140. These application thread stacks 130 can be scanned once the associated application threads 120 reach a preemption point in the code that they are executing. Background core-specific garbage collector threads 140 can also prepare to begin execution on their individual core once the application threads 120 reach their preemption points.

In step 310, all running application threads are requested to yield to a preemption request. At step 340, multiple parallel application threads 120 wait for each other to reach their preemption points to allow for a shared coordination between the application threads 120.

Reference to the from-space 150 and the to-space 160 can also be exchanged during the initialization process. This is illustrated at step 350. During a replicating garbage collection procedure, objects are placed into the to-space 160 and at the end of the collection, all referenced objects will have been placed in a dense prefix of the to-space 160. The garbage collector 140 can simply abandon the from-space 150 until the start of the next garbage collection process. Hence, during initialization, the from-space 150 from a previous garbage collection can now become the to-space 160 and the to-space 160 can now become the from-space 150. Any pointers referring respectively to either to-space or from-space can be exchanged. Each suspended application thread 120 can also be marked to indicate that a flip of the memory locations has occurred. This is illustrated at step 360.

Application threads 120 are allowed to continue allocating new objects 152 from existing thread-local allocation buffers. However, because of the flip that has now occurred, the thread-local allocation buffers which resided in the to-space 160 now reside in the from-space 150. This is illustrated at step 370.

Suspended application threads 120 can resume regular execution at this point. This is illustrated at step 380. Once a suspended application thread 120 begins to run, it can scan its current activation frame. An activation frame is a region of the application thread stack which an application thread 120 uses to hold temporary variables while executing code for a particular function. During execution of a function, an application thread 120 may overwrite a pointer field of an existing object or may overwrite a pointer contained within the activation frame. Application threads 120 can scan the activation frame and promptly notify the garbage collector 140 of any changes that may have occurred. Garbage collector threads 142 can also begin their background processing and start to perform their individual garbage collection tasks. This is illustrated at step 390.

Figure 4:
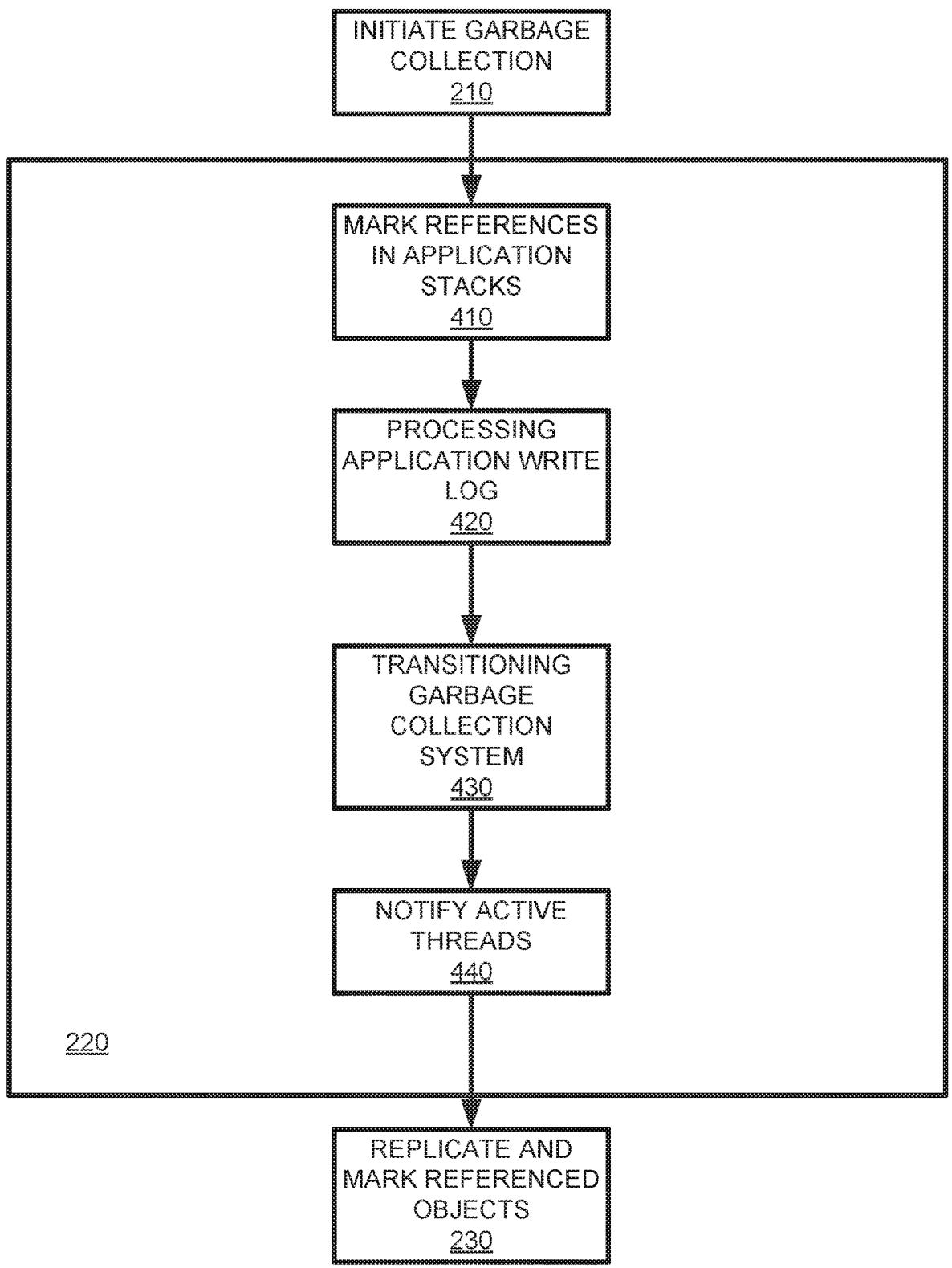
FIG. 4 is a flow diagram illustrating a process of marking referenced objects, according to embodiments of the present disclosure.

FIG. 4 is a flow diagram illustrating process step 220 of FIG. 2 above, marking referenced objects, of process 200, in greater detail according to embodiments of the present disclosure. To illustrate process step 220, FIG. 4 is described within the context of garbage collection system 100 of FIG. 1 and process 200 of FIG. 2.

Each replicating garbage collector thread 142 incrementally scans the application thread stacks 130. This is illustrated at step 410. Utilizing the mark list 180, partition-garbage collector threads 142 can initially scan application thread stacks 130 that belong to a memory partition corresponding to the garbage collector thread 142. For each referenced object 152 found in one of the application thread stacks 130, the coordination thread marks the object 152 if it has not already been previously marked and if the object resides in the coordination thread's memory partition. Marking can consist of overwriting an object's garbage collection pointer field with a link to the mark list 180 value and adjusting the mark list 180 value to the point to the object. Since each memory partition maintains its own mark list 180, no locking is required by the coordination thread when marking objects.

Each coordination thread processes the write logs 170. This is illustrated at step 420. Processing a write log 170 can include examining the address of each object 152 to which the application thread 120 overwrites fields. The coordination thread can also mark those objects 152 for replication. Also, for any reference value written to memory, the written reference value is stored as part of the write log 170. The coordination thread can mark the objects 152 referenced by a written pointer value if it has not already been marked for replication.

During incremental scanning of each application thread stack 130 by the garbage collector threads 142, supplemental processing of a trampoline subroutine may occur. A trampoline function scans the activation frame of a caller to which control is returning before returning control back to the caller. Scanning can include examining each live reference field and marking the referenced objects 152 for replication. In addition, the trampoline function can maintain a low-water mark of the thread stack 130 that indicates the smallest stack size during execution of the most current garbage collection pass.

Special coordination protocols can assure integrity of each thread stack when the stack is being scanned by the combined efforts of the trampoline handler and a garbage collector thread 142. Each thread can maintain several state variables for the purpose of coordinating incremental application thread stack 130 scanning efforts between the running application thread 120 and a garbage collector thread 142.

For example, a low_water_mark field can represent the lowest stack height to which the application thread's stack 130 has shrunk since a particular garbage collection phase began. At the start of certain garbage collection phases, the low_water_mark is set to NULL. The first time the thread runs during this garbage collection phase, it sets the low_water_mark to the activation frame immediately beneath the current frame. Whenever the thread stack shrinks, either because of return from the running function or because of a thrown exception, the low_water_mark is adjusted if necessary. While a thread is running, this variable is only accessed by the application thread 120 itself, so no synchronization is required.

A background_scan_pointer field can point to the start of the activation frame that is currently being scanned if a garbage collector thread 142 is currently scanning the stack 130. Otherwise, this points to the start of the last activation frame that was scanned by the garbage collector thread 142 or to the bottom of the stack 130 if the scanning thread has not yet scanned any activation frames. This variable is only accessed by the background garbage collector thread 142 so no synchronization is required.

An unscanned_stack field of the thread description can represent a tally of how much memory within the stack 130 remains to be scanned. Access to this variable is shared between the garbage collector thread 142 and the application thread's trampoline handler. At the start of any garbage collection phase that scans the thread's stack, the unscanned_stack is set to represent the total number of bytes that must be scanned by a combination of background and trampoline scanning efforts. Both threads can use load-with-reservation and store-conditional protocols to atomically update this variable.

A scanning_count field of the thread description can represent a count of how many threads are currently scanning this thread's stack. If the thread's stack 130 has been completely scanned, the scanning_count is zero. If the application is running and the stack 130 is not yet completely scanned, this count equals 2 if a garbage collector thread 142 is scanning the stack 130 in the background while the application continues to run and 1 if the garbage collector thread 142 is not scanning the stack in the background. When parallel scanning of a thread stack 130 finishes, the background garbage collection executes an export barrier, following which the application thread performs an input barrier. This assures that any changes to the stack that were made by the garbage collector's scanning thread will be visible to the application thread when it accesses the same memory locations.

The coordinating behaviors of the application thread 120 and of the background garbage collector thread 142 can require multiple steps. For example, background garbage collector threads 142 can give preference to the scanning of thread stacks 130 associated with application threads 120 that are currently suspended (i.e. not running). Scanning of these stacks 130 can be more efficient because the background garbage collector thread 142 scanning does not require coordination with the application thread's 120 scanning of its own activation frames.

Background stack 130 scanning can scan from the bottom of the stack towards the top, adjusting the background_scan_pointer as it goes. Before scanning each activation frame, the scanning thread decrements the unscanned_stack field by the size of the activation frame to be scanned. If the application thread 120 is running, the scanning thread uses load-with-reservation and store-conditional instructions to atomically adjust the value of the unscanned_stack field. Otherwise, the scanning thread updates the unscanned_stack field without using special synchronizing instructions.

The coordination protocol can require that the top-most activation frame be scanned (and its size has been removed from unscanned_stack) at all times. This can prevent the background garbage collector threads 142 from accidentally scanning parts of the stack that are no longer active, or worse, that have become newly active with a different memory content than was in place when the background garbage collector thread 142 began its scanning efforts. Before returning from a function whose activation frame has been scanned to a caller function whose activation frame has not been scanned, the size of the activation frame is atomically subtracted from the unscanned stack total and the caller's activation frame is scanned. In accordance with this protocol, any activation frame being scanned by the background garbage collector thread 142 is not the top-most activation frame. Furthermore, before an application thread 120 may return into the activation frame that is being scanned by the background scanning thread, it must wait for the background scanning efforts of this activation frame to be completed.

To establish the coordination invariant, the background garbage collector thread 142 is not allowed to begin scanning the stack until after the top-most frame of the stack has been scanned. Until the top-most stack frame has been scanned, the low_water_mark field equals NULL.

In one embodiment, the caller maintains a pointer to a description of an invoked method at a known offset within its activation frame. As it prepares to scan another activation frame, the background garbage collector thread 142 examines the pointer to the frame to be scanned which it finds within the activation frame that it most recently scanned. The object 152 referenced by this pointer provides a detailed description of the contents of the next activation frame on the stack 130.

The background garbage collector thread 142 then takes responsibility for scanning the next activation frame by atomically decrementing the value of unscanned stack by the size of the activation frame to be scanned. As part of this atomic update, the background garbage collector thread 142 must first verify that the application thread 120 has not already taken responsibility for scanning the same activation frame. Pseudocode for the background scanning thread's behavior follows:

```
scanActivationFrame:
retry:
  rx = load-with-reservation (unscanned_stack);
  ry = rx - new_frame_size;
  if (rx == 0) {
    // This frame has been or is being scanned by the
    // application thread. My role in scanning this
    // thread stack is done.
  lwsync;                    // export barrier
retry2:
```

```
rz = load_with_reservation (scanning_count) - 1;
if (!store_conditional (scanning_count; rz)
    goto retry2;
return FINISHED;
} else if (!store-conditional (unscanned_stack; ry))
    goto retry;
// I have exclusive access to this frame; so scan it.
last_frame = (ry == 0);
rx = return address pointer of this activation frame
if (rx == trampoline function)
    rx = true return address pointer of this activation frame
Lookup the live-pointer-register information associated with
    the caller's preemption point at position rx
Scan the live pointers contained within this activation frame at this
    particular preemption point
if (return address for the function whose activation frame was just
        scanned points to the trampoline handler) {
    // This trampoline handling is vestigial; from a previous gc pass
    overwrite the function's return address with its true return address;
}
if (last_frame) {
    lwsync;                          // export barrier
retry3:
    rz = load_with_reservation (scanning_count) - 1;
    if (!store_conditional (scanning_count, rz)
        goto retry3;
}
return FINISHED;
```

In the case that an application thread 120 is resumed following preemption and the application thread's 120 low_water_mark field equals NULL; the current activation frame is scanned before control resumes. The pseudocode implementation of the code that executes when the application thread 120 is resumed following a preemption is shown below:

```
if ((low_water_mark == NULL) &&
    ((gc_phase == MarkThreadReferencedLiveObjectsPhase)
        || (gc_phase == WindDownPhase) || (gc_phase == OverwriteRootsPhase))) {
    Use the preempted function's saved instruction pointer to lookup
        the live-pointer-register information associated with the
        current preemption point;
    Scan the live pointers within the activation frame;
    Set low_water_mark to be the top of scanned activation frame;
retry:
    rx = load-with-reservation (unscanned_stack);
    rx -= size of scanned activation frame;
    if (!store-conditional (unscanned_stack, rx))
        goto retry;
    if (rx == 0) {
retry2:
        ry = load-with-reservation (scanning_count);
        if (!store-conditional (scanning_count; 0))
            goto retry2;
    } else
        start up the background scanning thread on this stack;
```

Coordination between the trampoline handler and the background stack scanning thread can be subtler. Even after a stack has been completely scanned, the trampoline handler is responsible for maintaining the thread's low_water_mark. The pseudocode implementation of the trampoline handler is provided below:

```
Trampoline:
    // Upon entry; r1 points to the caller's activation frame. The first double-
    // word of the activation frame points to the end of the caller's activation
    // frame; which is the start of the next activation frame.
    caller_frame_size = size of the caller's activation frame;
    if (scanning_count > 0) {
        // This stack is still being scanned.
retry:
        rx = load-with-reservation (unscanned_stack);
        ry = rx - caller_frame_size;
        if (rx == 0) {
            // The caller frame has been or is being scanned by
            // scanning thread. Wait for scanning thread to finish.
retry2:
            rz = load-with-reservation (scanning_count);
            if (rz != 1) goto retry2;
            if (!store_conditional (scanning_count; 0))
                goto retry2;
            isync                      // import barrier
        } else if (!store_conditional (unscanned_stack, ry))
            goto retry;
        else {
        Consult the InvokedMethodImplementation object found within activation
        frame of the caller's caller to identify which registers hold live
```

```
        pointers at preemption point named by the true return address;
        Scan each of these pointers;
    }
}
if (low_water_mark < stack_pointer + caller_frame_size)
    low_water_mark = stack_pointer + caller_frame_size;
if (return address stored within the activation frame of the caller's caller
        does not represent the trampoline handler) {
    Copy the return address from the activation frame of the caller's
    caller into the true return address field of the same activation frame;
    Overwrite the return address in the activation frame of the caller's caller
    with the address of the trampoline handler;
}
return to the address stored in the true return address field of caller's
activation frame;
```

When an exception is thrown, multiple activation frames may be instantaneously removed from the thread's stack 130. This may leap over the thread's low_water_mark and the trampoline return address that had been placed in its associated activation frame. This may also leap over the activation frame that is currently being scanned by the background scanning thread. If the program were to continue executing after catching the thrown exception, the application may overwrite the activation frame that the background scanning thread is examining, resulting in undefined and undesired behavior. For these reasons, the application thread 120 must wait for certain scanning activities to complete before throwing an exception. The following pseudocode describes the process of throwing an exception:

```
ThrowException:
    if (scanning_count > 0) {
        Compute the activation frame that will catch the thrown exception.
        Compute the distance in memory between the low_water_mark and the
        start of the new activation frame; Call this abandoned_stack;
        Compute the size of the activation frame that will catch the thrown
        exception; Call this new_activation_size;
        if (abandoned_stack + new_activation_size > 0) {
            // Catcher's frame is below low_water_mark. Has it been scanned
            // by the background scanning thread?
retry:
            rx = load-with-reservation (unscanned_stack);
            ry = rx - (abandoned_stack + new_activation_size);
            if (ry <= 0) {
                // The destination stack frame has already been scanned.
                while (!store-conditional (unscanned_stack, 0))
                    load_with_reservation (unscanned_stack);
                // Now wait for scanning thread to finish before unwinding
                // stack.
                while (load_with_reservation (scanning_count) == 2)
                    ;
                isync;           // import barrier
                while {!store_conditional (scanning_count, 0))
                    load_with_reservation (scanning_count);
                // The destination frame has already been scanned by
                // the garbage collection thread.
            } else if (!store_conditional (unscanned_stack, ry))
                goto retry;
            else {
                // I am responsible for scanning of the destination frame.
                Consult the InvokedMethodImplementation object identified in activation
                frame of the catcher's caller to identify which registers hold live
                pointers at the preemption point associated with the catch handler for
                the thrown exception;
                Scan each of these pointers;
                Set this thread's low_water_mark to the top of scanned activation frame;
                if (the return address stored within the activation frame of the caller's
                        caller does not represent the trampoline handler) {
                    Copy return address from the activation frame of the catcher's caller
                    into the true return address field within the same activation frame;
                    Overwrite the return address in the activation frame of the catcher's
                    caller with the address of the trampoline handler
                }
            }          // Catchers frame is above low_water_mark; already scanned
    }              //Stack scanning not active; no special processing required
    Unwind stack and allow control to flow to the catch statement;
```

The garbage collection system 100 can be prepared to transition to the next phase of garbage collection. This is illustrated at step 430. Active application threads 120 are notified that the garbage collection process is transitioning.

This is illustrated at step 440. Non-running application threads 120 can also be notified when they are next scheduled for execution.

Figure 5:
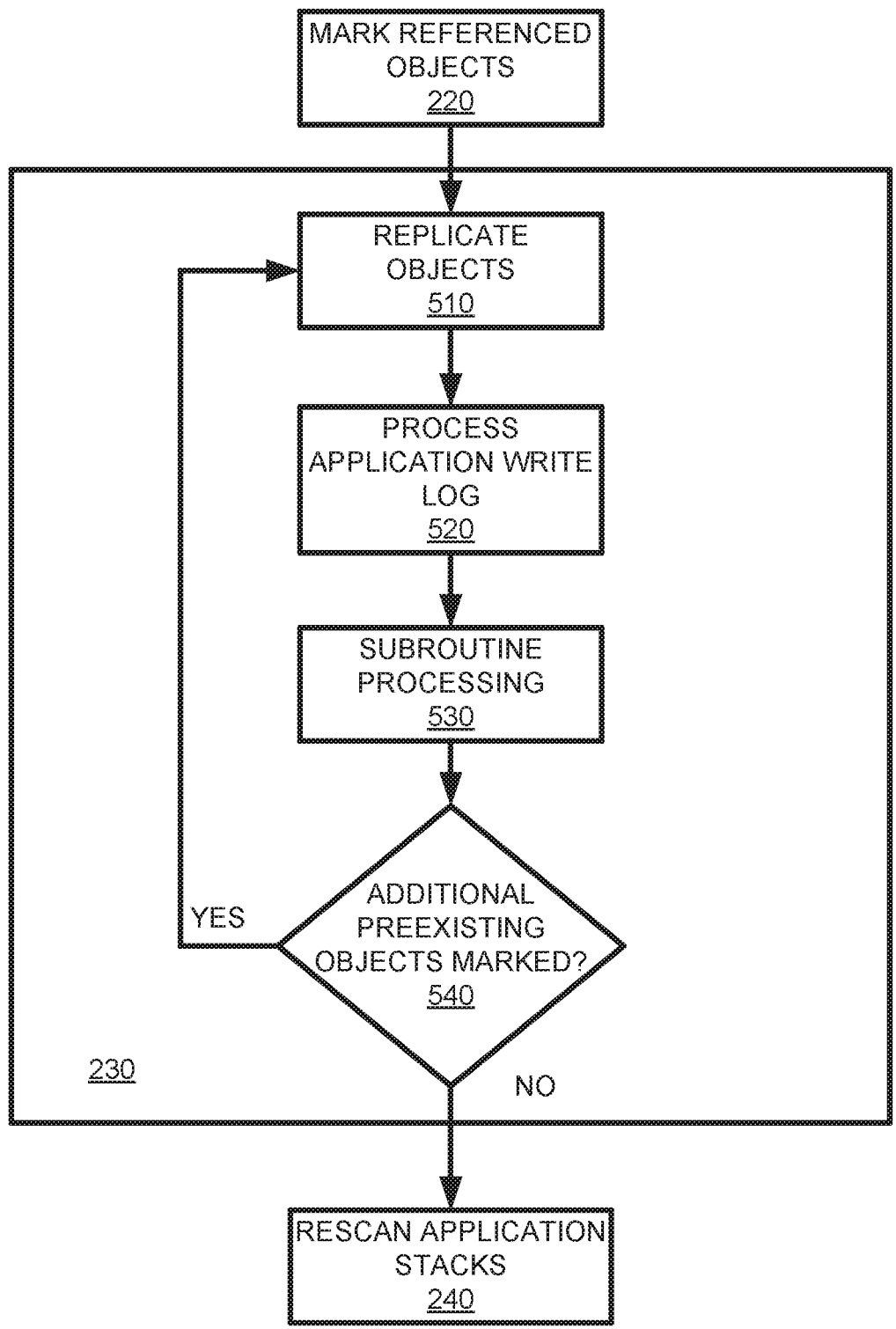
FIG. 5 is a flow diagram illustrating a process of replicating referenced objects, according to embodiments of the present disclosure.

FIG. 5 is a flow diagram illustrating step 230 of FIG. 2 above, replicating referenced objects, of process 200, in greater detail according to embodiments of the present disclosure. To illustrate process step 230, FIG. 5 is described within the context of garbage collection system 100 of FIG. 1 and process 200 of FIG. 2.

Each replicating garbage collector thread 142 begins replicating marked referenced objects 152 into their corresponding memory locations in the to-space 160. This is illustrated at step 510. Each replicating garbage collector thread 142 first copies the objects 152 originally residing within its own memory partition. If there is no available copying work to be performed in its own memory partition, the replicating garbage collector thread 142 can assist with the copying of objects 152 residing in other memory partitions.

As data is copied, any references to the from-space 150 that are embedded within the copied objects 152 are replaced with reference to the replica object 162 stored within the to-space 160. Memory may be set aside for the replica object 162 of the referenced from-space object 152 before the address can be written.

Whenever memory is set aside to hold the replica objects 162, available replicating garbage collector threads 142 can initiate the copying process on those objects needing replication. A notification can be sent to the replicating garbage collector thread 142, informing it that a new workload is available for replication.

In some embodiments, each memory partition maintains a list of objects 152 needing replication (object_replicas) and another list of overwrite operations (overwrite_replicas) that need to be replicated. Multiple replicating garbage collector threads 142 can work in parallel within each memory partition to copy different from-space objects 152 onto their to-space replica objects 162. Only one replicating garbage collector thread 142 at a time may replicate overwrite operations associated with each memory partition. While one replicating garbage collector thread 142 is replicating overwrite operations, no other thread may be replicating objects pertaining to the same memory partition. As replicating garbage collector threads 142 exhaust their copying workloads, additional workloads can be retrieved by examining the object_replicas and overwrite_replicas lists.

When a replicating garbage collector thread 142 is not copying entire objects 152, it can copy the overwritten fields of previously copied objects 152. This is illustrated at step 520. Processing a write log 170 can occur in several steps. In a first step, the coordination thread sorts each logged overwrite operation into multiple partitioned write logs 170, with each partitioned write log 170 holding a log of overwrite operations that modified objects 152 belonging to a particular memory partition. The coordination thread can then transmit each partitioned write log 170 to the garbage collector thread 142 responsible for the memory partition to which it corresponds. Additionally, the coordination thread can examine each pointer value written to memory and mark the object 152 referenced by the pointer if the object 152 resides in its own memory partition. If the object 152 resides in a different memory partition, the coordination thread communicates a mark request to a coordination thread pertaining to the memory partition where the referenced object 152 resides. In a second step, each coordination thread marks and reserves replica memory, if necessary, for each of the overwritten objects 152 residing in its own memory partition. In a third step, the coordination thread communicates the list of overwrite operations to one of its associated replicating garbage collector threads 142 by merging this list onto the overwrite_replicas list.

Each application requires additional processing by an application's trampoline subroutine. This is illustrated at step 530. As discussed, the trampoline function maintains a low-water mark for the application thread 120 that represents the smallest stack size for the application thread 120 since initiating garbage collection.

A determination is made as to whether ongoing scanning efforts are continuing to find pre-existing unmarked objects 152. Finding newly allocated unmarked objects 152 does not disqualify transitioning to the next garbage collection phase. This is illustrated at step 540. In order to transition to the next garbage collection phase, each memory partition must have completely copied all previously marked pre-existing objects, and no memory partition has any newly marked pre-existing objects 152 within the most recent span during which each application thread 120 running within the memory partition is preempted at least twice. The application threads 120 can be notified that the next phase of the garbage collection process is going to occur by notifying them during their preemptions.

Figure 6:
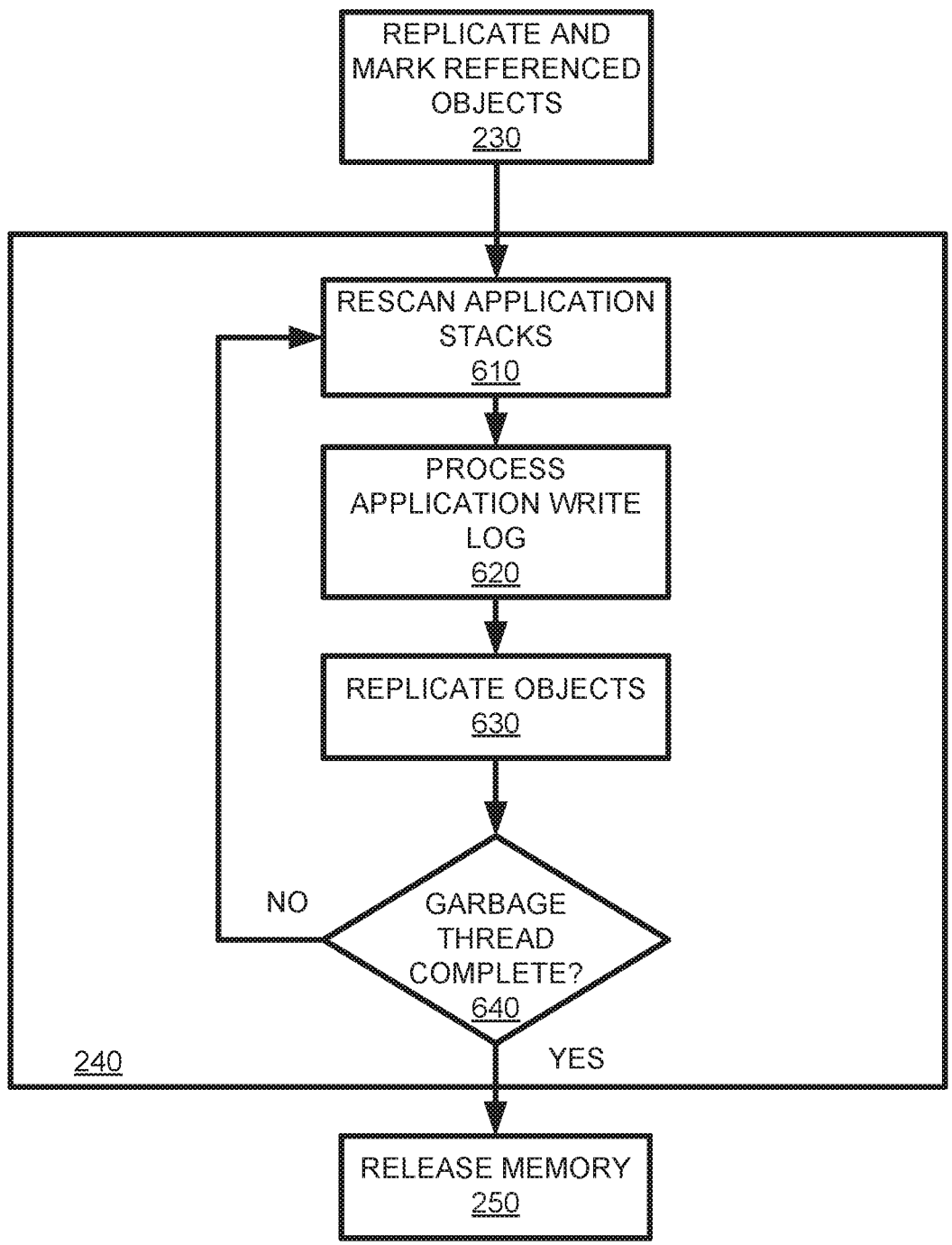
FIG. 6 is a flow diagram illustrating a process of replicating activation frame objects, according to embodiments of the present disclosure.

FIG. 6 is a flow diagram illustrating step 240 of FIG. 2 above, rescan application stacks, of process 200, in greater detail according to embodiments of the present disclosure. To illustrate process step 240, FIG. 6 is described within the context of garbage collection system 100 of FIG. 1 and process 200 of FIG. 2.

Each application thread stack 120 is rescanned using a coordinated effort between garbage collector threads 142 and application threads 120, similar to step 410. This is illustrated at step 610. Application thread stacks 130 with an affinity to a particular core can be scanned by the corresponding core-specific garbage collector thread 142. The garbage collector threads 142 can begin scanning the application thread stack 130 from their individual low-water marks. As each activation frame on the application thread stack is scanned, the unscanned_stack variable for the associated thread can be decremented to reflect that the frame has been scanned. Once the application thread stacks have been scanned and any objects 152 marked, the garbage collector threads 142 can replicate the newly found objects 152 into the to-space 160.

Each application thread 120 processes its individual write log 170 again. This is illustrated at step 620. Processing a write log 170 can include examining the address of each object 152 to which the application thread 120 writes fields. The application thread 120 can also mark those objects 152 for replication. Also, for any reference value written to memory, the application thread 120 can mark those referenced objects 152 if it has not already been marked for replication.

Within this portion of the garbage collection process, application threads 120 can behave in particular ways. Following each preemption point, another preemption is immediately requested. As such, every application thread 120 can be preempted approximately every µs. This allows the garbage collector 140 to become aware of any additional live objects that have not yet been marked and replicated. Preemption requests can also be slightly altered to where the individual application threads each examine their recently fetched pointer values for each preemption request. This can help to assure that all referenced objects in memory have been identified.

The garbage collector threads 142 are examined to determine whether the replication process is complete. This is identified at step 640. Replication is complete when all garbage collector threads 142 are idle, all garbage collection work queues are empty, and every application thread 120 has reached a preemption point without newly identifying any live preexisting objects that were not yet marked. If replication is not complete, the process continues by rescanning the application thread stacks 130 until the system reaches completion. The first time the stack 130 is rescanned during this step 240 of garbage collection, all activation frames between the stack's low-water mark and the current top-of-stack pointer are incrementally scanned by a combination of trampoline handling and background garbage collection thread efforts. For all subsequent rescanning of application stacks 130 during step 240 of garbage collection, only the portion of the stack 130 that has been modified since the immediately preceding scan of the stack 130 is scanned, and this scanning is performed by the application thread 120 before it yields to each preemption request.

After replication is complete, all application threads 120 are informed of the transition to the next phase of garbage collection. This need not happen atomically. Each application thread's 120 state can be adjusted to reflect the transition before the application thread 120 is next scheduled for execution. Beside setting the state of each application thread 120 to represent the start of the next garbage collection phase, each allocation buffer of the application threads 120 is replaced with a buffer residing in the to-space 160. Next, suspended application threads 120 are allowed to resume execution in coordination with the next phase of garbage collection.

Figure 7:
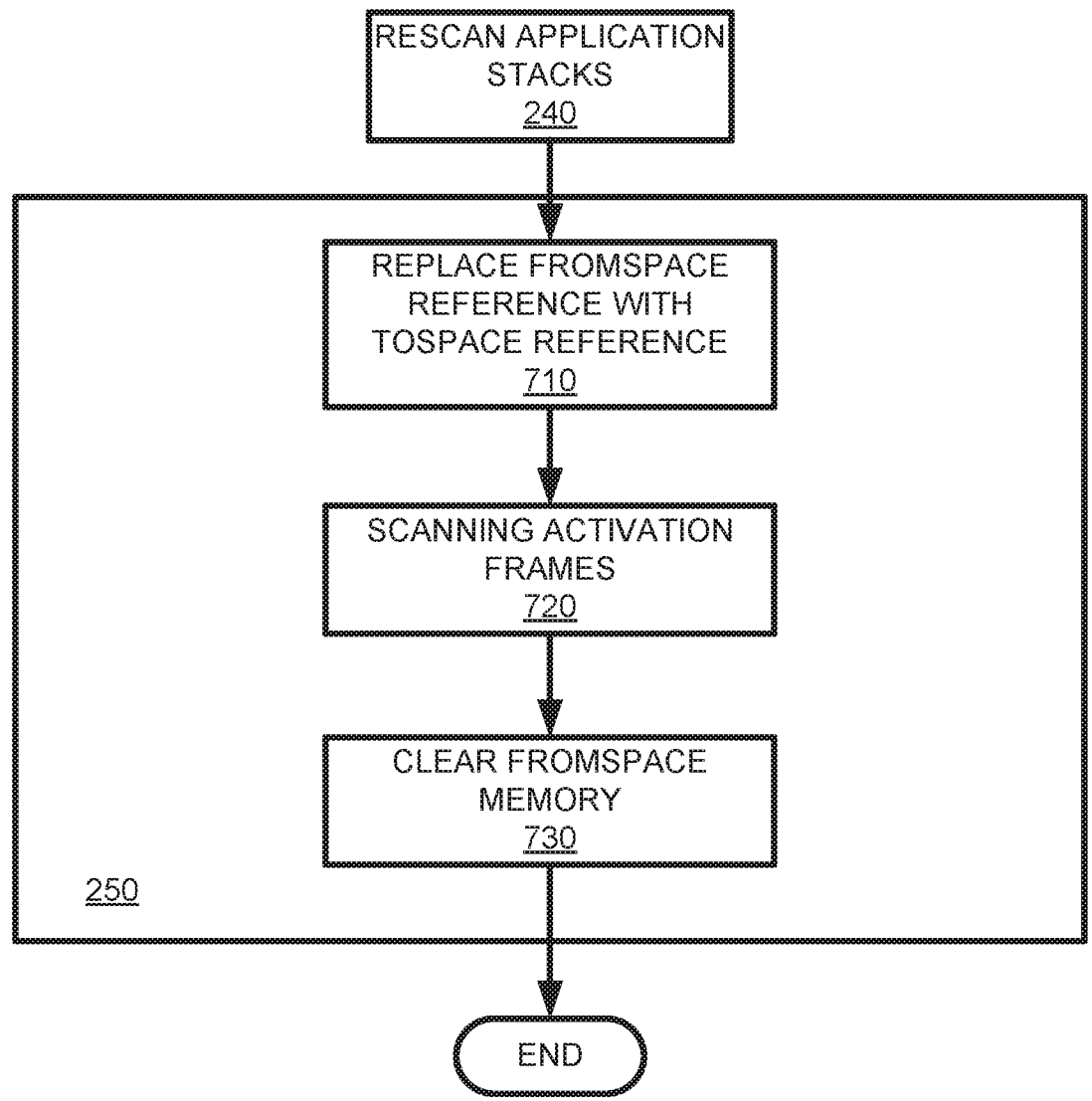
FIG. 7 is a flow diagram illustrating a process of overwriting references, according to embodiments of the present disclosure.

FIG. 7 is a flow diagram illustrating step 250 of FIG. 2 above, overwriting pointers, of process 200, in greater detail according to embodiments of the present disclosure. To illustrate process step 250, FIG. 7 is described within the context of garbage collection system 100 of FIG. 1 and process 200 of FIG. 2.

Having identified and replicated all live objects, each root pointer that refers to a referenced object 152 stored within the from-space 150 is overwritten with a pointer to the corresponding replicated object 162 in the to-space 160. This is illustrated at step 710. Each garbage collector thread 142 assigned to scan stack contents can scan the application thread stacks 130 and perform the overwriting process. Starting with the bottom of the application thread stacks 130 and working to the top of the application thread stacks 130.

Additionally, each application thread 120 can scan and overwrite the from-space 150 pointers contained within its top-most activation frame when the application thread 120 is first resumed as part of the current step 250 of garbage collection. Return from a method invocation initiates a trampoline subroutine wherein the application thread 120 scans the caller's activation frame, overwriting each from-space pointer within that activation frame with a reference to the object's 152 replica object 162. This is illustrated at step 720. Until the application thread stack 130 has been completely scanned, the trampoline subroutine is called for the application thread 120 to scan the activation frame. Similar to the garbage collector threads 142, the application threads 120 overwrite pointers that refer to referenced objects 152 stored within the from-space 150 with a pointer to the corresponding replicated object 162 in the to-space 160.

Once all of the application thread stacks 130 are scanned, the memory allocated for the from-space is cleared out. This is illustrated at step 730. This can be accomplished by placing all zeroes into the memory. Additionally, each replicated object's 162 garbage collection pointer is set to null. This prepares the garbage collection system 100 for the next cycle of garbage collection.

FIG. 8A-G are block diagrams illustrating a heap 800, according to one embodiment of the present disclosure. The heap 800 includes object A 815-1, object B 815-2, object C 815-3, and object D 815-4 (e.g., which may be the same as, or substantially similar to, objects 152 of FIG. 1) located in an allocated memory location referenced as from-space 850 (e.g., which may be the same as, or substantially similar to, from-space 150 of FIG. 1). The heap also includes a replicated object B' 816-2 (e.g., which may be the same as, or substantially similar to, replicated objects 162 of FIG. 1) located in an allocated memory location referenced as to-space (e.g., which may be the same as, or substantially similar to, to-space 160 of FIG. 1), root pointer 820, replicated pointer 830, and allocated pointer 840.

For simplicity of discussion, the Figures show a replicated pointer, a single root pointer and only four heap-allocated objects. In an actual system, there may be hundreds of root pointers, representing the contents of each thread's run-time stack. There could also potentially be millions of objects to be garbage collected. In a multi-core implementation, there may be no replicated pointer as each core takes responsibility for replicating the objects residing at different location within memory.

Figure 8A:
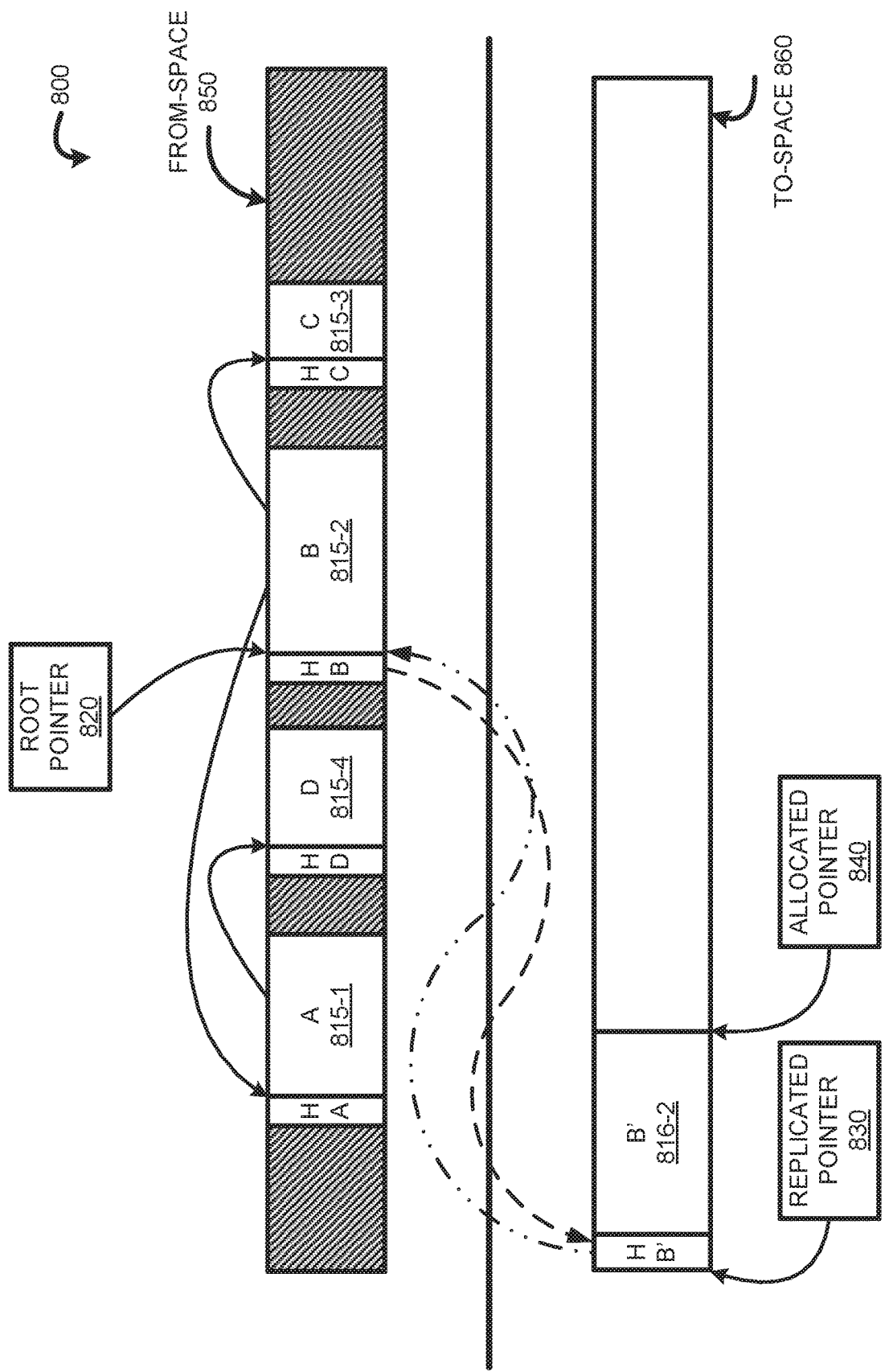
FIG. 8A-G are block diagrams of memory semi-spaces being manipulated by the garbage collection process, according to embodiments of the present disclosure.

FIG. 8A represents an exemplary state of memory in a heap immediately following initialization of the garbage collection process. In FIG. 8A object B 815-2 includes pointers to object A 815-1 and object C 815-3. The root pointer 820, pointing to object B 815-2, has been scanned and memory has been reserved in the to-space 860. This is represented by replica object B' 816-2. The replicated pointer 830 points to the beginning of object B' 816, indicating that the contents of object B 815-2 has not yet been copied. The allocated pointer 840 points to the end of object B' 816-2, denoting that memory has been reserved to represent this object.

A garbage collection pointer in the header of replicated object B' 816-2 points to the original object B 815-2. This is illustrated with a dashed and dotted line from the header of object B' 816-2 to object B 815-2 Likewise, a garbage collection pointer in the header of object B 815-2 contains a forwarding pointer to object B' 816-2. This is illustrated with a dashed line.

The allocated pointer 840 points to the next memory location available for objects to be replicated. The replicated pointer 830 points to the end of memory that is currently being copied. Any objects beyond the replicated pointer 830 still require copying of their contents. As the replicated pointer 830 in FIG. 8A still points to the start of the to-space 860, no garbage collection thread has taken the responsibility for copying the contents from object B 815-2 to object B' 816-2.

Multiple background garbage collection threads can share the responsibility of copying the contents of referenced objects out of from-space 850 into to-space 860. As soon as one thread begins the copying process, it can advance the replicated pointer so that a different garbage collection thread can identify the next object to be copied.

Figure 8B:
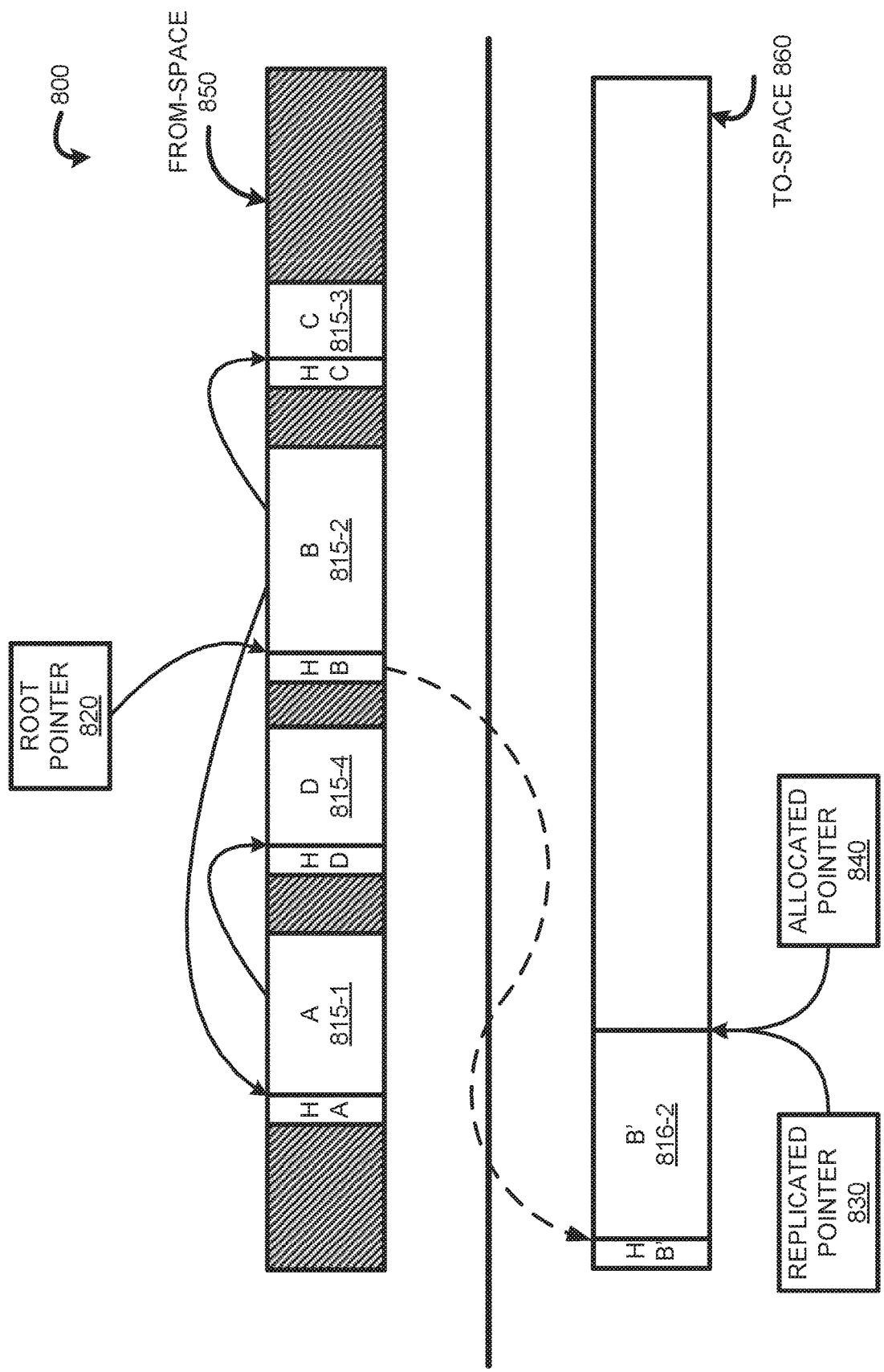

FIG. 8B represents an exemplary state of memory in a heap after a garbage collector has taken responsibility for copying object B 815-2. As the garbage collector thread prepares to copy object B 815-2, it removes the backward pointer from replicated object B' 816-2 to object B 815-2. This is illustrated with the removal of the dashed and dotted line pointing from the header of B' 816-2 to object B 815-2.

The dashed forwarding pointer from object B 815-2 to replicated object B' 816-2 remains as this is needed to affect a subsequent flip of the semi-spaces. Once a garbage collection thread has taken responsibility for copying the contents of object B 815-2, the replicated pointer 830 is moved to the end of the replicated object B' 816-2.

Figure 8C:
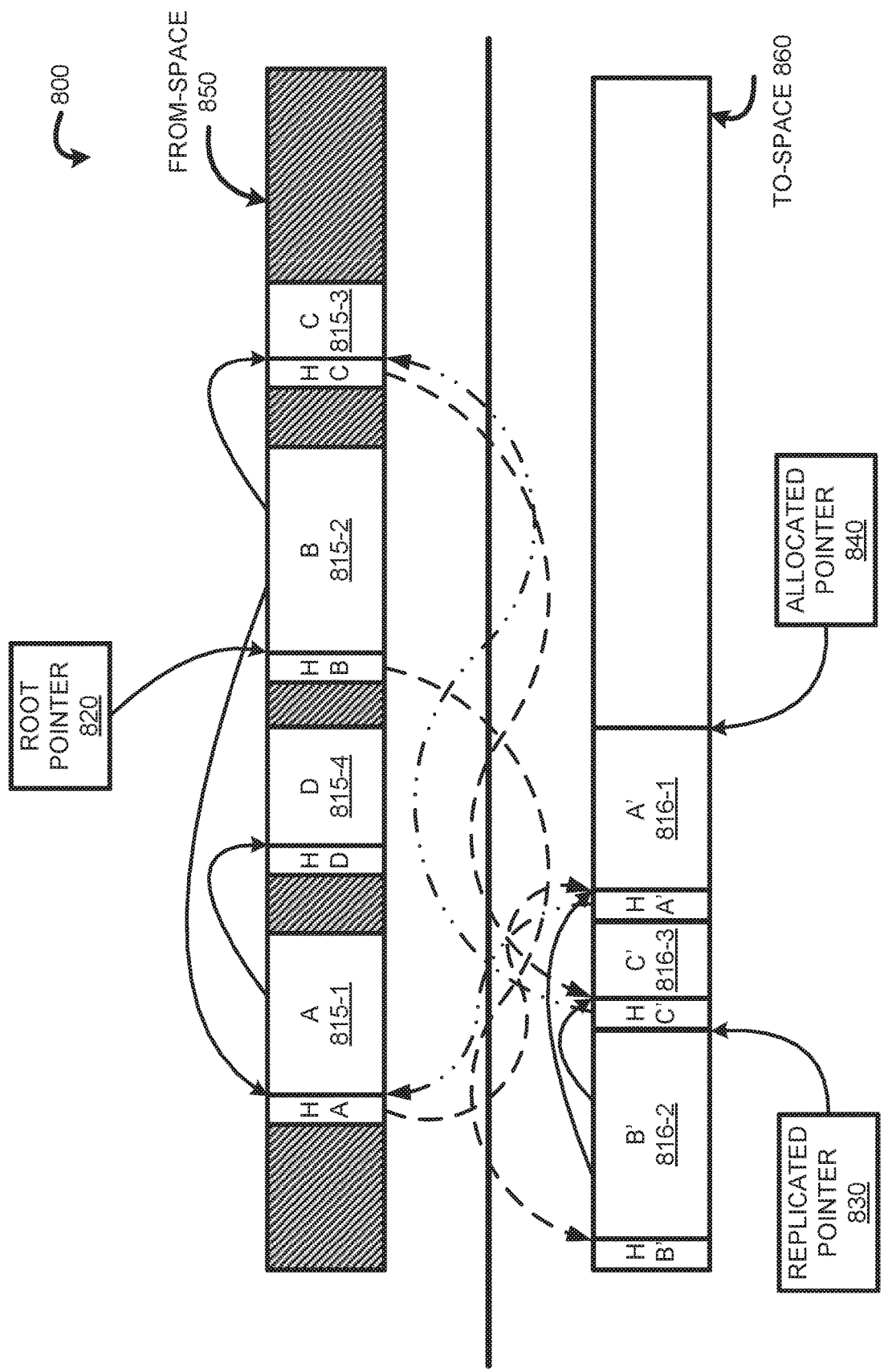

FIG. 8C represents an exemplary state of memory in a heap after object B 815-2 has been copied into to-space 860. Prior to copying the object B 815-2, a garbage collector thread 142 scans the contents of object B 815-2 and marks any objects referenced from within. This causes memory to be reserved within the to-space 860 for the replicas of objects A 815-1 and C 815-3 as illustrated by replicated object C' 816-3 and replicated object A' 816-1. The allocated pointer 840 is shifted to the end of replicated object A' 816-1. Both replicated objects include backward pointers that represent the content location of those objects. This is illustrated with dashed and dotted lines to the original objects and dashed lines to the replicated objects.

Figure 8D:
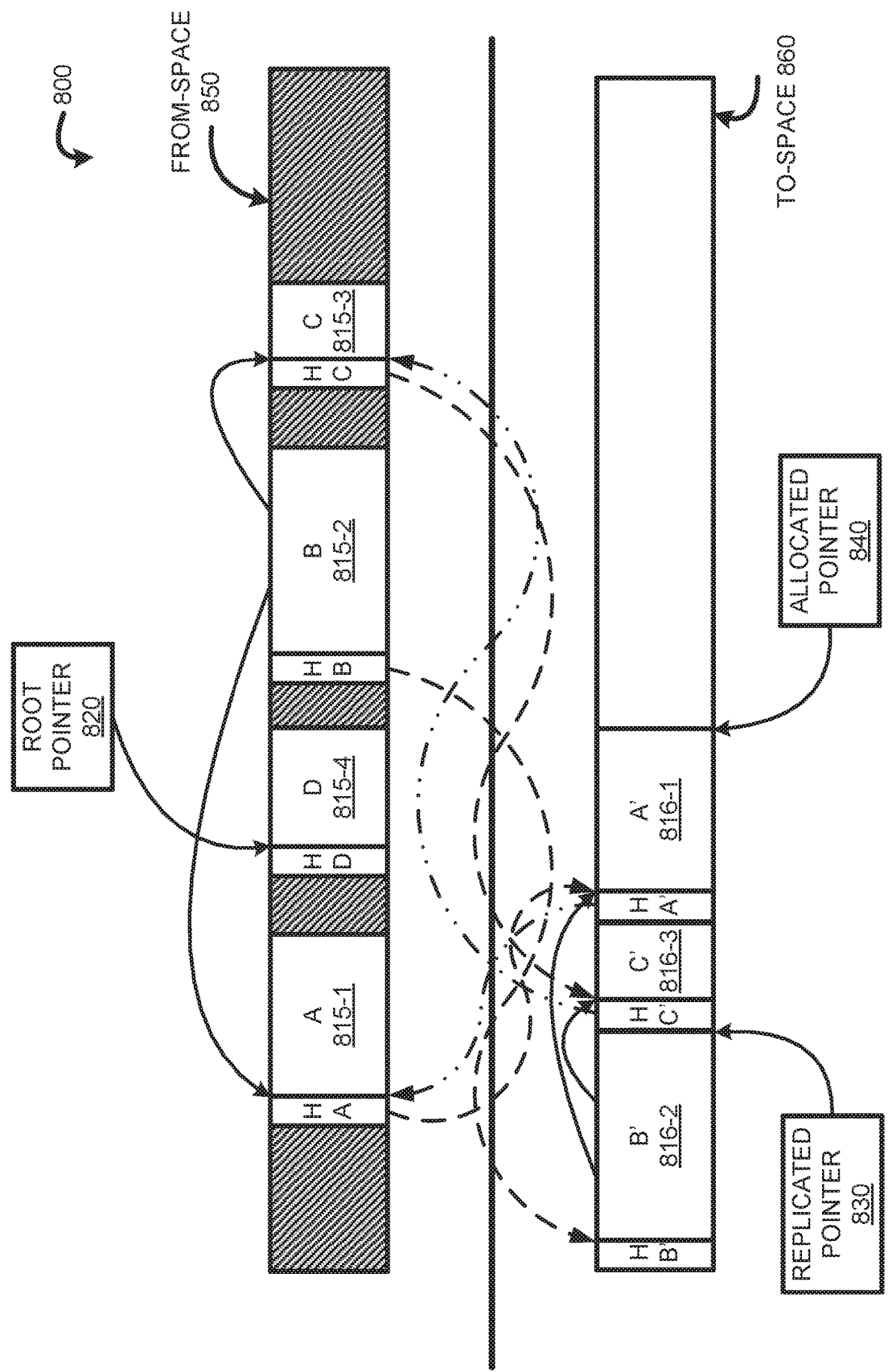

FIG. 8D represents an exemplary state of memory in a heap after an application changes the connectivity graph of the root pointer 820. At this point, the garbage collection process has been preempted by an application thread. The application thread has realigned its root pointer 820 to point to object D 815-4 as illustrated by having root pointer 820 point to object D 815-4 in FIG. 8D. Object A 815-1 also no longer references object D 815-4. However, object D 815-4 is still live since it is referenced by the root pointer 820. The garbage collector will not see that object D 815-4 is still live during the replication of object A 815-1.

Figure 8E:
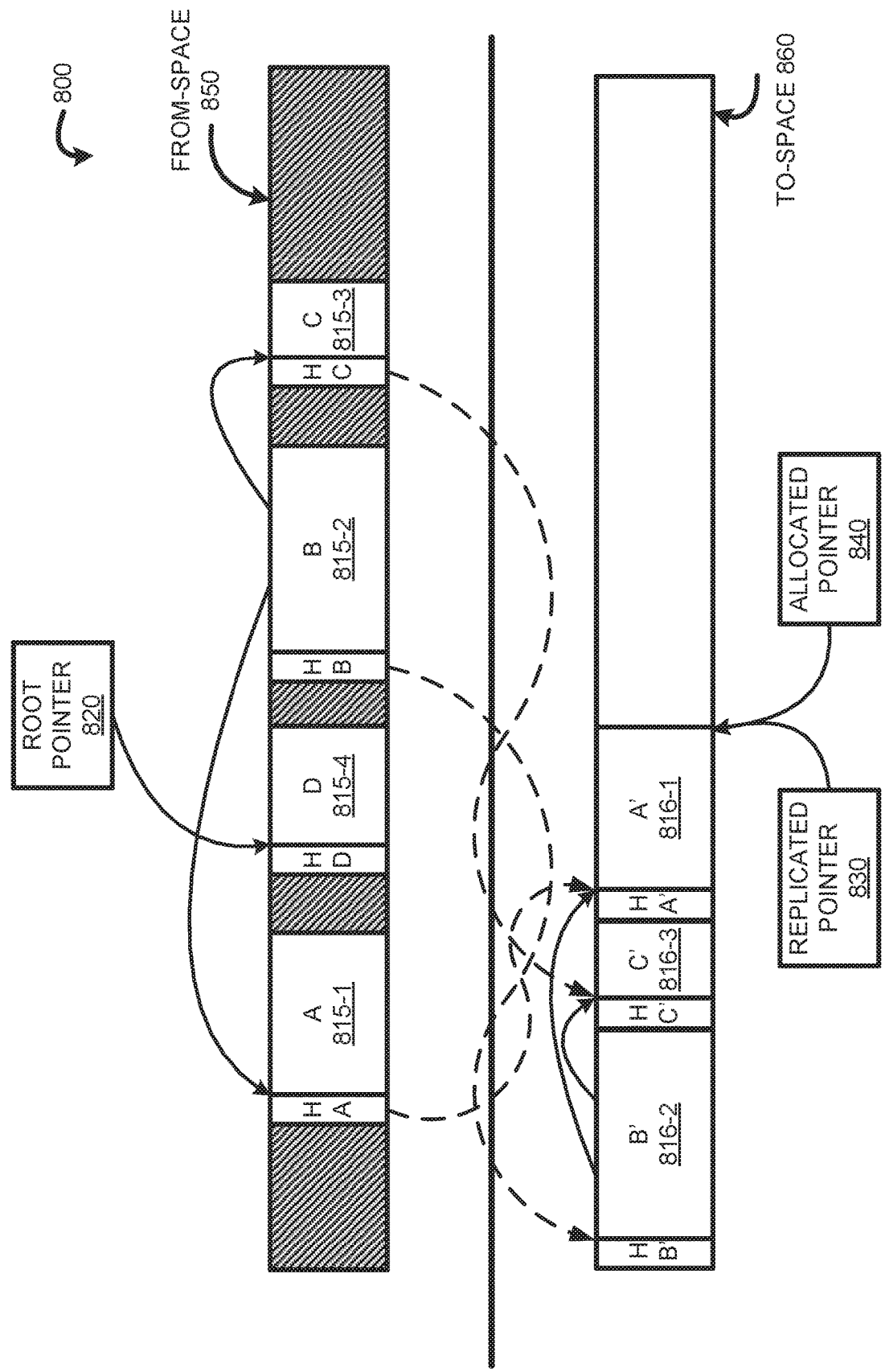

After the background garbage collector threads 142 finish copying the contents of objects C 815-3 and A 815-1, the memory may appear as shown in FIG. 8E. Objects A 815-1, B 815-2, and C 815-3 are no longer referenced from the root pointer 820. These can be considered dead objects or "latent objects". Since they became dead during the garbage collection process, their memory will not be reclaimed until a subsequent garbage collection pass.

FIG. 8E represents an exemplary state of memory in a heap after the objects in the from-space 850 have been copied into the to-space 860. The garbage collector completes the copying of objects C 815-3 and A 815-1 for which memory had been reserved in the to-space 860. The application continues to see the from-space 850 versions of memory at this point.

Figure 8F:
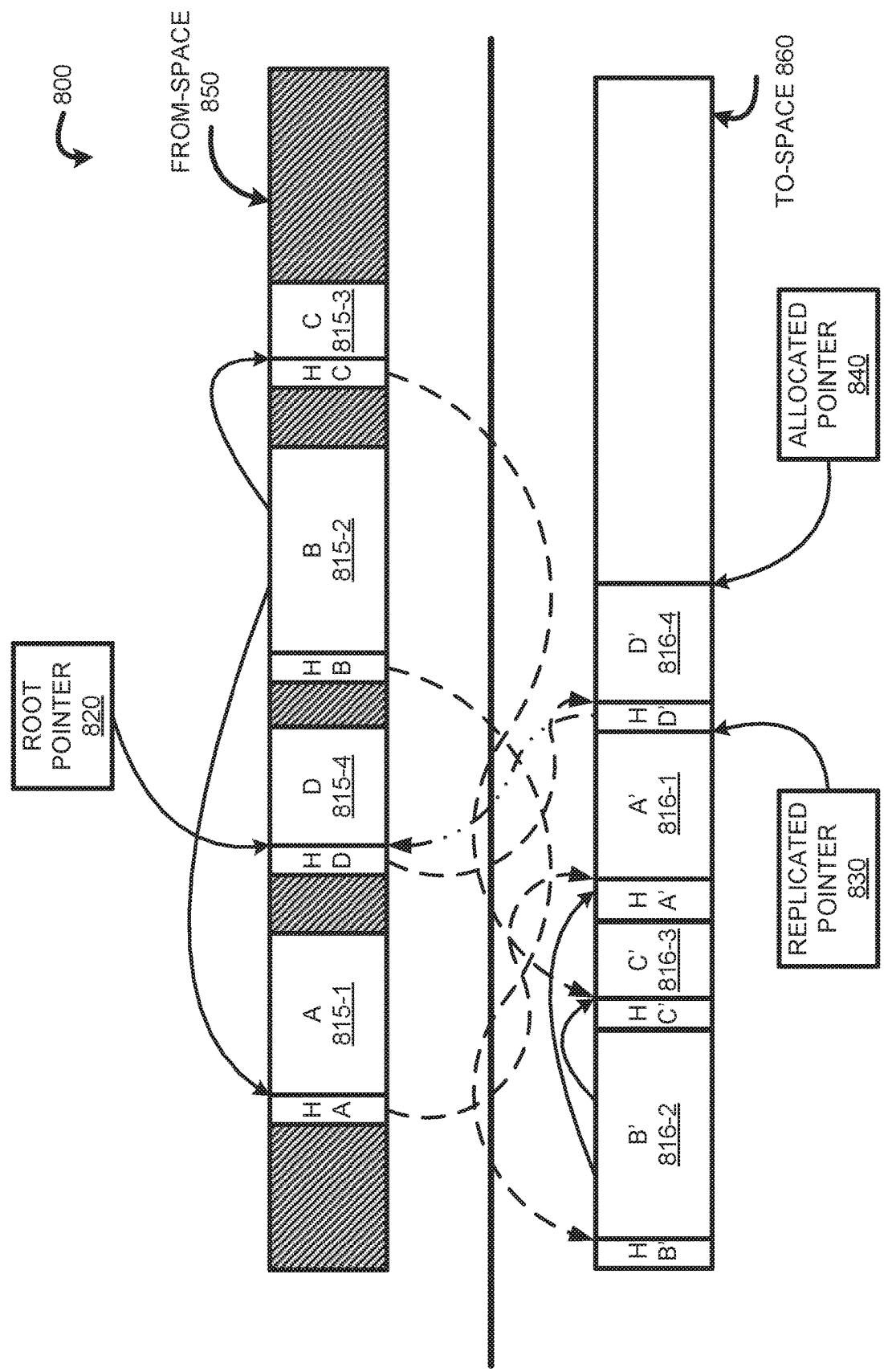

FIG. 8F represents an exemplary state of memory in a heap after a rescan of the root pointer 820. It is necessary to rescan the root pointer 820 to check whether there might exist any additional referenced objects that have not been marked for replication. Upon scanning the root pointer 820, object D 815-4 is discovered, and space is reserved in the to-space 860.

A rare pathology can exist during termination of the replication process. If object D 815-4 held pointers to a deeply linked data structure (e.g., N levels deep), and at each level of the data structure, the pointers to the next deeper level are hidden from the garbage collector in the same way that object D 815-4 was hidden, then termination of the replication phase may require N rescans of the root pointer 820.

Figure 8G:
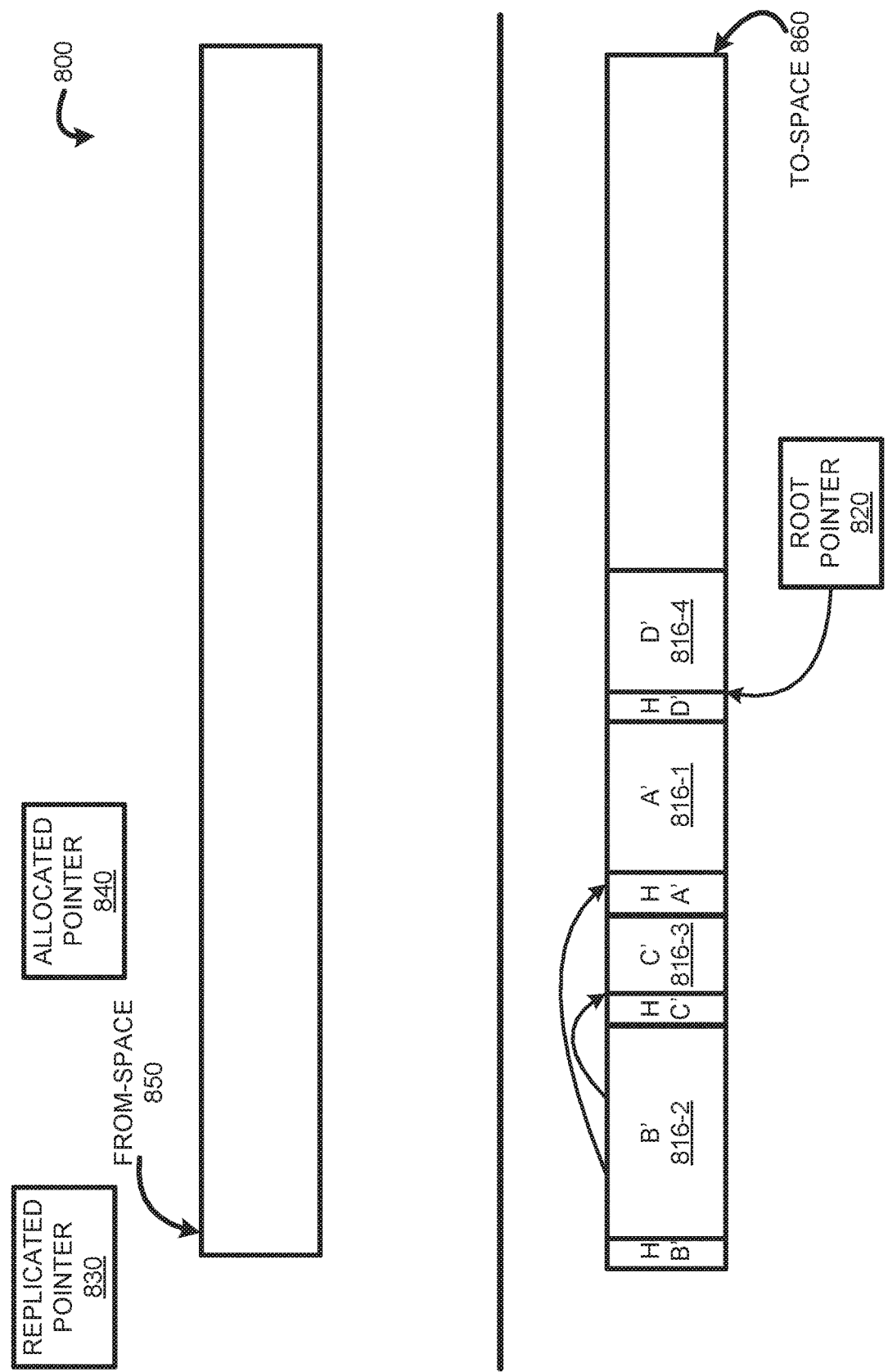

FIG. 8G represents an exemplary state of memory in a heap after overwriting the root pointer 820 with replica references. At this time, the root pointer 820 is rescanned, replacing the from-space 850 pointer with a pointer to the corresponding to-space 860 replica. This can be accomplished by following the forwarding pointer. Once the root pointer 820 has been updated to point to the to-space replica, the garbage collector can zero out the contents of from-space 850 in preparation for the next pass of garbage collection. At the start of the next garbage collection pass, the labels of from-space 850 and to-space 860 can be exchanged and the process can begin again.

Figure 9:
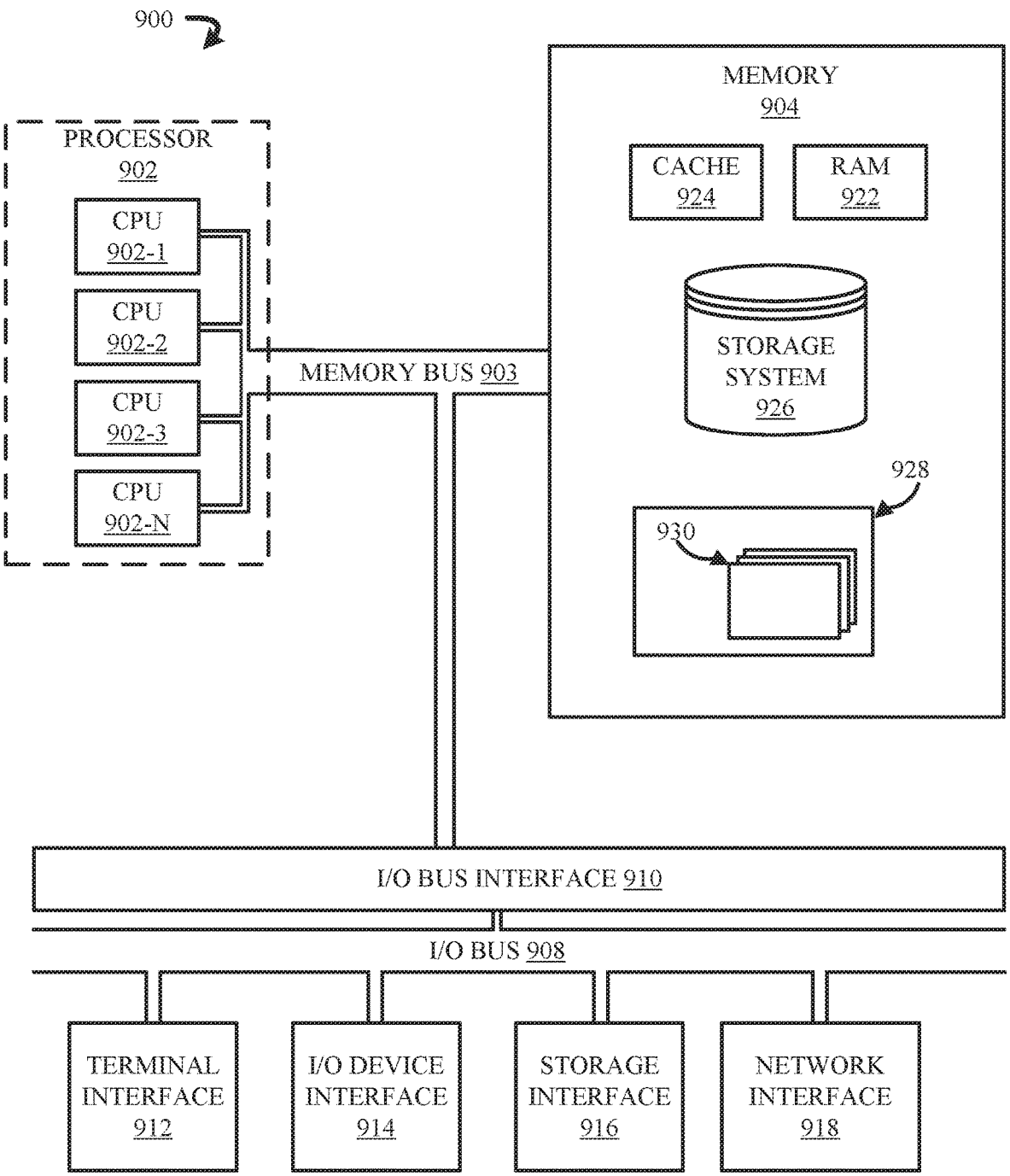
FIG. 9 is a block diagram illustrating a computer system, according to embodiments of the present disclosure.

Referring now to FIG. 9, shown is a high-level block diagram of an example computer system 901 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 901 may comprise one or more CPUs 902, a system memory 904, a terminal interface 912, a storage interface 916, an I/O (Input/Output) device interface 914, and a network interface 918, all of which may be communicatively coupled, directly or indirectly, for inter-component communication via a memory bus 903, an I/O bus 908, and an I/O bus interface 910.

The computer system 901 may contain one or more general-purpose programmable central processing units (CPUs) 902-1, 902-2, 902-3, and 902-4, herein generically referred to as the CPU 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may include one or more levels of on-board cache.

System memory 904 may include computer system readable media in the form of volatile memory, such as random-access memory (RAM) 922 or cache memory 924. Computer system 901 may further include other removable/non-removable, volatile/non-volatile computer system storage media. By way of example only, storage system 926 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 928 and/or program modules 930 generally perform the functions or methodologies of various embodiments.

In some embodiments, the program modules 930 of the computer system 901 may include a retention enhancement module. The retention enhancement module can be configured to obtain user data for a user currently reading electronic text on a device, analyze the user data to determine whether a retention action should be issued, and execute a retention action in response to a determination that the retention action should be issued.

Although the memory bus 903 is shown in FIG. 9 as a single bus structure providing a direct communication path among the CPUs 902, the memory subsystem 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 901 may, in some embodiments, contain multiple I/O bus interface units 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface but receives requests from other computer systems (clients). Further, in some embodiments, the computer system 901 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for garbage collection on a system, the method comprising:
   preempting an application thread executing application code in real-time for a first limited pause time to allow for garbage collection, wherein the limited pause time is not limited by at least the system and the application code;
   replicating live objects stored on a first semi-space to contiguous locations in a second semi-space following the first limited pause time;
   preempting an application thread executing the application code for a second limited pause time to allow for the garbage collection, wherein the second limited pause time is not restricted by at least the system and the application code;
   determining whether at least one of the live objects still requires replication during the second limited pause time;
   upon determining that the live objects have been replicated, overwriting references to the live objects stored on the first semi-space with new references to replica objects stored on the contiguous locations in the second semi-space; and
   wherein the garbage collection provides for interleaved and parallel execution of the application code.

2. The computer-implemented method of claim 1, wherein the application code includes a plurality of application threads, and the garbage collection includes a plurality of garbage collection threads, wherein the application threads and the garbage collection threads run on multiple cores, each of the multiple cores including support for one or more simultaneous thread contexts.

3. The computer-implemented method of claim 2, further comprising:
   accessing, by the plurality of application threads, the live objects stored on the first semi-space wherein no extra instructions are needed when the plurality of application threads access the live objects.

4. The computer-implemented method of claim 2, further comprising:
   overwriting, by the plurality of application threads, the live objects located in the first semi-space prior to the second limited pause time.

5. The computer-implemented method of claim 4, wherein overwriting the live objects does not require a memory fence operation.

6. The computer-implemented method of claim 2, wherein replicating the live objects comprises:
   scanning an application thread stack of the application code incrementally by coordinating the garbage collection threads and the application threads to identify the live objects for replicating; and
   scanning, by the application threads, an activation frame of a function in the application code, wherein the activation frame is scanned by a trampoline handler automatically invoked by overwriting a return address of the function being executed.

7. The computer-implemented method of claim 6, further comprising:
   generating a log by the application threads, wherein the log includes a list of object references accessible by the application threads, a history of store operation performed by the application threads, and a snapshot of an allocation buffer of the application threads representing the live objects recently allocated by the application threads; and
   providing the log to the garbage collection threads when the application threads are preempted.

8. The computer-implemented method of claim 6, further comprising:
   confirming that the live objects have been marked for replication by rescanning a portion of the application thread stack modified since a previous scan; and
   terminating the garbage collection upon determining that the application threads have been suspended, the application thread stack has been scanned, and the live objects have been replicated.

9. A computer program product for garbage collection on a system, the computer program product comprising a computer readable storage medium having program instructions embodied therewith, the program instructions executable by a processor to cause the processor to:
   preempt an application thread executing application code in real-time for a first limited pause time to allow for garbage collection, wherein the limited pause time is not restricted by at least the system and the application code;

replicate live objects stored on a first semi-space to contiguous locations in a second semi-space following the first limited pause time;

preempt an application thread executing the application code repeatedly for a second limited pause time to allow for garbage collection, wherein the second limited pause time is not restricted by at least the system and the application code;

determine whether at least one of the live objects still requires replication during the second limited pause time;

upon determining that the live objects have been replicated, overwrite references to the live objects stored on the first semi-space with new references to replica objects stored on the contiguous locations in the second semi-space; and wherein the garbage collection provides for interleaved and parallel execution of the application code.

10. The computer program product of claim 9, wherein the application code includes a plurality of application threads, and the garbage collection includes a plurality of garbage collection threads, wherein the application threads and the garbage collection threads run on multiple cores, each of the multiple cores including support for one or more simultaneous thread contexts.

11. The computer program product of claim 10, further comprising instructions to cause the processor to:
access, by the application threads, the live objects stored on the first semi-space wherein no extra instructions are needed when the plurality of application threads access the live objects.

12. The computer program product of claim 10, further comprising instructions to cause the processor to:
overwrite, by the application threads, the live objects located in the first semi-space prior to the second limited pause time.

13. The computer program product of claim 12, wherein overwrite the live objects does not require a memory fence operation.

14. The computer program product of claim 10, wherein replicate the live objects comprises instructions to cause the processor to:
scan an application thread stack of the application code incrementally by coordinating garbage collection threads and the plurality of application threads to identify the live objects for replicating; and
scan, by the application threads, an activation frame of a function in the application code, wherein the activation frame is scanned by a trampoline handler automatically invoked by overwriting a return address of the function being executed.

15. The computer program product of claim 14, further comprising the instructions to cause the processor to:
generate a log by the application threads, wherein the log includes a list of object references accessible by the application threads, a history of store operation performed by the application threads, and a snapshot of an allocation buffer of the application threads representing the live objects recently allocated by the application threads; and
provide the log to the garbage collection threads when the application threads are preempted.

16. The computer program product of claim 14, further comprising the instructions to cause the processor to:
confirm that the live objects have been marked for replication by rescanning a portion of the application thread stack modified since a previous scan; and
terminate the garbage collection upon determining that the application threads have been suspended, the application thread stack has been scanned, and the live objects have been replicated.

17. A system, comprising:
a processor;
a memory to store instructions, which when executed from the memory, cause the processor to perform operations, the operations including, preempt an application thread executing application code in real-time for a first limited pause time to allow for garbage collection, wherein the limited pause time is not restricted by at least the system and the application code;
replicate live objects stored on a first semi-space to contiguous locations in a second semi-space following the first limited pause time;
preempt an application thread executing the application code repeatedly for a second limited pause time to allow for the garbage collection, wherein the second limited pause time is not restricted by at least the system and the application code;
determine whether at least one of the live objects still requires replication during the second limited pause time;
upon determining that the live objects have been replicated, overwrite references to the live objects stored on the first semi-space with new references to replica objects stored on the contiguous locations in the second semi-space; and
wherein the garbage collection provides for interleaved and parallel execution of the application code.

18. The system of claim 17, wherein the application code includes a plurality of application threads, and the garbage collection includes a plurality of garbage collection threads, wherein the application threads and the garbage collection threads run on multiple cores, each of the multiple cores including support for one or more simultaneous thread contexts.

19. The system of claim 18, further comprising the operations to cause the processor to:
access, by the application threads, the live objects stored on the first semi-space wherein no extra instructions are needed when the application threads access the live objects.

20. The system of claim 18, further comprising the operations to cause the processor to:
overwrite, by the application threads, the live objects located in the first semi-space prior to the second limited pause time.

* * * * *